US012769739B2

(12) United States Patent
Arabi et al.

(10) Patent No.: US 12,769,739 B2
(45) Date of Patent: Oct. 20, 2026

(54) METHOD AND SYSTEM FOR A DRILLING ASSISTANT USING KNOWLEDGE GRAPHS AND RETRIEVAL AUGMENTED GENERATION DURING A FIELD OPERATION

(71) Applicant: Schlumberger Technology Corporation, Sugar Land, TX (US)

(72) Inventors: Hakim Arabi, Houston, TX (US); Minyue Liu, Houston, TX (US); Elias Temer, Clamart (FR); Qiuhua Liu, Houston, TX (US); Lina Xu, Houston, TX (US); Ganesh Arunachalam, Houston, TX (US); Jinsoo Kim, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/229,017

(22) Filed: Jun. 5, 2025

(65) Prior Publication Data

US 2026/0119496 A1 Apr. 30, 2026

Related U.S. Application Data

(60) Provisional application No. 63/714,277, filed on Oct. 31, 2024.

(51) Int. Cl.
*G06F 16/2453* (2019.01)
*G06F 16/901* (2019.01)
*G06F 16/9038* (2019.01)

(52) U.S. Cl.
CPC .... *G06F 16/24545* (2019.01); *G06F 16/9024* (2019.01); *G06F 16/9038* (2019.01)

(58) Field of Classification Search
CPC ........... G06F 16/24545; G06F 16/9038; G06F 16/9024
See application file for complete search history.

(56) References Cited

U.S. PATENT DOCUMENTS

2023/0126509 A1* 4/2023 Zhang ................. G06F 16/9024 707/715
2025/0061303 A1* 2/2025 Sun ........................ G06N 3/096
(Continued)

OTHER PUBLICATIONS

"What is a vector database", Elastic, Retrieved from the internet: https://www.elastic.co/what-is/vector-database, Retrieved date—Mar. 3, 2026, 13 pages.
(Continued)

*Primary Examiner* — Courtney Harmon
(74) *Attorney, Agent, or Firm* — Kyle R. Miiller

(57) ABSTRACT

A method for providing advanced analytics and domain-specific insights related to a site. The method includes receiving data related to a site, building a graph database from the received data, querying the graph database, generating a response based on the query, displaying the generated response within a graphical interface on a screen, and performing a site action based on the displayed response. Generating the response may include reviewing a chat history for the response related to the query, displaying the response on the screen when the response is found in the chat history, and sending the query to a supervisor when the response is not found in the chat history. After the query is sent to the supervisor, the supervisor may delegate the query to one or more sub-agents which in turn may generate the response.

20 Claims, 26 Drawing Sheets

(56) References Cited

U.S. PATENT DOCUMENTS

| | | | | |
|---|---|---|---|---|
| 2025/0150345 | A1* | 5/2025 | Sun | H04L 41/0886 |
| 2025/0156413 | A1* | 5/2025 | Barkan | G06F 16/243 |
| 2025/0198275 | A1* | 6/2025 | Antonio | E21B 44/00 |
| 2025/0373575 | A1* | 12/2025 | Maheshwari | G06F 16/243 |
| 2026/0004110 | A1* | 1/2026 | Higgins | G06N 3/0475 |
| 2026/0037501 | A1* | 2/2026 | Raal | G06F 16/243 |

OTHER PUBLICATIONS

Bratanic, T., "RAG Tutorial: How to Build a RAG System on a Knowledge Graph", Neo4j, Inc., Retrieved from the internet: https://neo4j.com/blog/developer/rag-tutorial/, Aug. 22, 2025, 14 pages.
Liu, B. et al., "LLM+P: Empowering Large Language Models with Optimal Planning Proficiency", arXiv:2304.11477v3, Sep. 27, 2023, 8 pages.
Shinn, N. et al., "Reflexion: Language Agents with Verbal Reinforcement Learning", arXiv:2303.11366v4, Oct. 10, 2023, pp. 1-19.
Weng, L., "LLM Powered Autonomous Agents", Lil'Log, Retrieved from the internet: https://lilianweng.github.io/posts/2023-06-23-agent/, Jun. 23, 2023, 23 pages.
Yao, S. et al., "ReAct: Synergizing Reasoning and Acting in Language Models", arXiv:2210.03629v3, Mar. 10, 2023, pp. 1-33.

* cited by examiner

800

This document solves town connection issues when an IoT hub or http connection error is detected from Azure IoT Hub SDK or http client sdk. Here are some common exceptions for this type of error:

SocketException
TimeoutException
Host cannot be reached
Failed to get wells with wellIds Procedure:

Start at Step 1. All steps may not need to be executed and the steps may not to be executed in order.

Step 1: Start, Go to Step 2.

Step 2: GetTwonConfig

Retrieve or identity the endpoint and the port by calling the getTownConfig() funtion. Pass the return value from the function call to step 3: getConnectivityStatus.

Step 3: GetConnectivityStatus

Call the function getConnetivityStatus(endpoint, port) with each endpoint and port returned from step 2.

if the endpoint is not reachable move on to step 4. Else, go to Step 8 End.

FIG. 11

| |
|---|
| FirewallSpecialistTHINK : THINK: Since step 1 has been executed and it instructs to move to step2.<br>EXECUTE: Step2: GetTownonfig<br>Call the function getTownConfig() to retrieve or identify the endpoint and the port<br>INPUT: None |
| FirewallSpecialistTOOL : Output:<br>[["api.demo.drillops.slb.com",5671]] |
| FirewallSpecialistTHINK : THINK: Since step 2 executed and it document instructs that we jump to step 3 for that output<br>ECECUTE: Step 3: GetConnectivityStatus<br>Call the function getConnectivityStatus(endpoint, port) with each endpoint and port returned from step 2.<br>If the endpoint is not reachable move on to step 4. Else, go to Step 8 End.<br>INPUT: ['api.demo.drillops.sib.com',5671] |
| FirewallSpecialistTOOL : output:<br>false |

FIG. 15

| |
|---|
| FirewallSpecialistFINISH : THINK: Since step 7 executed and the firewall rule was found for the endpoint, we need to move to step 8.<br>EXECUTEL Step 8: End, Give relevant output<br>Output: Firewall Successfully updated |

FIG. 16 query: How many rigs are used per quarter in 2024?

standalone query: How many rigs are used per quarter in 2024?

```
cypher query from 11m: MATCH (r:Rig) - [:HAS_WELL] - > (w:Well) - [:HAS_EVENT] - > (e: Event) - [:OCCURED] - > (h:Hour) < - [HAS_CHILD]< - [d:Day)< - [HAS_CHILD] - (m:Month) < - [:HAS_CHILD] - (y:Year)
WHERE y. number = 2024 AND m.number IN [1, 2, 3]
RETURN 'Q1' AS Quarter, count(e) AS numberofRigs
UNION
MATCH (r:Rig) - [:HAS_WELL) - > (w:Well) - (:HAS_EVENT] - > (e:Event) - [:OCCURED] - > (h:Hour) < - [:HAS_CHILD] - (d:Day) < - [HAS_CHILD] - (m:Month) < - [:HAS_CHILD] - (y:Year)
WHERE y. number = 2024 AND m.number IN [4, 5, 6]
RETURN 'Q2' AS Quarter, count(e) AS numberofRigs
UNION
MATCH (r:Rig) - [:HAS_WELL) - > (w:Well) - (:HAS_EVENT] - > (e:Event) - [:OCCURED] - > (h:Hour) < - [:HAS_CHILD] - (d:Day) < - [HAS_CHILD] - (m:Month) < - [:HAS_CHILD] - (y:Year)
WHERE y. number = 2024 AND m.number IN [7, 8, 9]
RETURN 'Q3' AS Quarter, count(e) AS numberofRigs
UNION
MATCH (r:Rig) - [:HAS_WELL) - > (w:Well) - (:HAS_EVENT] - > (e:Event) - [:OCCURED] - > (h:Hour) < - [:HAS_CHILD] - (d:Day) < - [HAS_CHILD] - (m:Month) < - [:HAS_CHILD] - (y:Year)
WHERE y. number = 2024 AND m.number IN [10, 11, 12]
RETURN 'Q4' AS Quarter, count(e) AS numberofRigs
LIMIT 1000
```

Graph search finished. In 2024, the number of rigs used per quarter is as follows:

- Q1: 219, 902 rigs
- Q2: 50, 415 rigs
- Q3: 454, 506 rigs
- Q4:83, 471 rigs

FIG. 20

METHOD AND SYSTEM FOR A DRILLING ASSISTANT USING KNOWLEDGE GRAPHS AND RETRIEVAL AUGMENTED GENERATION DURING A FIELD OPERATION

This application claims priority to and the benefit of U.S. Provisional Patent Application No. 63/714,277, filed Oct. 31, 2024, which is hereby incorporated by reference in its entirety.

BACKGROUND

The ongoing adoption of digitization in the oil and gas sector, especially within drilling operations, has accelerated the deployment of digital technologies in the field. With this rapid growth, there is a desire for an effective framework to proactively monitor field deployments and enhance operational resilience.

Large Language Models (LLMs) hold potential for advanced data retrieval and insight generation, yet integrating these capabilities into real-time industrial analytics poses a challenge. Conventional business intelligence (BI) systems, relying on static dashboards and complex data transformations, often struggle to meet the dynamic demands of modern drilling operations. Previously, an advanced monitoring system featuring elastic fleet management was introduced to address this, combining real-time performance tracking with incident alerting capabilities integrated with tools such as Software as a Service (SaaS) incident management platforms. This approach established new benchmarks for reducing Non-Productive Time (NPT) and improving service delivery by providing Site Reliability Engineering (SRE) teams with tools to maintain high standards amid continuous expansion.

The oil and gas industry is undergoing a digital transformation, with real-time insights becoming helpful for operational efficiency, safety, and cost management. Conventional business intelligence systems have served as the backbone of industrial analytics but are increasingly inadequate for handling the scale, complexity, and dynamic standards of modern drilling operations. These systems rely heavily on complex data pipelines involving multiple database layers and processing platforms that aggregate and process data. While effective for static reporting, such systems often lead to inefficiencies and delayed insights in rapidly changing operational contexts.

Retrieval-Augmented Generation (RAG) systems powered by Large Language Models (LLMs) may provide a shift by integrating real-time data retrieval with natural language interfaces. However, conventional RAG systems often lack adaptability and scalability, limiting their effectiveness in handling the diverse, interconnected datasets found in drilling operations.

In the evolving landscape of drilling technologies, automation has emerged as a driver for improving efficiency, safety, and operational performance. For nearly a decade, the oil and gas industry has focused on deploying advanced tools such as rig mechanization, robotics, and AI-driven automation to optimize drilling operations. However, the full potential of these systems is still being realized, as delivering consistent financial savings and efficiency gains remains a challenge. The complexities of drilling operations, especially in remote and offshore environments, involve a comprehensive approach to automation that goes beyond conventional methods. It is not just about deploying the right tools but about creating a system that enhances overall performance, reduces tool runs, and adds measurable value to the bottom line.

To achieve these goals, integrating edge computing has become beneficial. By bringing AI-powered analytics and advanced processing closer to the operational environment, edge computing addresses the unique challenges of drilling automation. However, this also introduces cybersecurity risks, particularly when solutions are deployed on Operational Technology (OT) networks with restrictive access. Ensuring the security of these deployments is helpful, as it involves managing who accesses devices, detecting any unusual activities, and responding swiftly to incidents like reboots or suspicious network connections.

Observability, while a well-established concept in cloud computing, poses a different set of challenges when applied to edge environments. The complexity of rig networks, combined with bandwidth limitations, makes it difficult for centralized support teams to maintain a clear picture of what is happening at the edge. With support teams often located remotely and not at the rig site, it becomes imperative to provide real-time visibility into the status of devices and operations. To address these challenges, a flexible fleet management system has been implemented that enables proactive monitoring of edge deployments. This approach may ensure that support teams can detect anomalies, track access and activity, and manage the performance of devices from a central location, setting the stage for a quick and effective response. However, even with the fleet management system providing proactive monitoring, network isolation still poses significant challenges, as it limits the ability of SRE support teams to connect directly to edge devices.

Energy exploration digital platforms tackle drilling challenges by connecting the rig to town and automating operations through AI-driven solutions. Real-time connectivity and data-driven insights enable collaboration and performance. With global commercial deployments, its innovative platform sets the standard in drilling efficiency and sustainability. The energy exploration platform leverages cutting-edge technology and an experimental mindset to revolutionize drilling operations. For example, cloud-edge integration enables seamless connectivity and real-time collaboration between the wellsite and the office across the MWD (Measurement While Drilling), DD (Directional Drilling), surface logging, fluids, procedural adherence, and drilling domains. Additionally, AI-driven drilling automation brings enhanced safety, performance, and consistency to the drilling operation while data-driven insights, empower operators to overcome the limitations of traditional drilling practices, unlocking new levels of efficiency, safety, and sustainability. Furthermore, the energy exploration platform provides a modular design, thereby enabling scaling and distributed development of the system using plug-ins.

The energy exploration platform solution adopts a goal-based automation methodology, using powerful data analysis and learning systems to assist and optimize every task, from setting rate of penetration to drilling a stand. Users may choose from a preset menu of automatable drilling tasks, and using data analysis and models, share a plan to achieve the specified goal, taking any measurements required to calibrate itself. Operators have the flexibility to modify and replan activities dynamically, based on a live appraisal of equipment, personnel, and supplies.

Automation enables reduced staffing levels on mechanized rigs and delivers unparalleled consistency of repetitive tasks, helping users reach the technical limit on every well. Alert and escalate procedures are built directly into the energy exploration platform solution-making it easier to resolve any potential conflicts and administer corrective action. Everything that happens is automatically documented within the digital well file to streamline reporting and drive continuous improvement.

The energy exploration platform solution may be used to monitor and capture a broad range of operational data to support operators during drilling with real-time advice and coaching to improve decision-making and reduce risk. Intelligent advisory systems guide crews to stay within operating windows and safety thresholds. Predictive analytics continuously identify drilling dysfunctions, alerting personnel before pre-defined limits are due to be exceeded to reduce non-productive time (NPT).

Progress may be continually compared with targets defined in the drilling plan across a range of criteria, including operating costs and other key performance indicators, to deliver a live picture of performance. Any deviations from the plan are recorded in the digital well file, alongside all the relevant operational data. By capturing the full operational context across multiple domains, the energy exploration platform solution may increase the value of reporting and post-job analysis to improve every subsequent well.

The energy exploration platform solution may execute the digital drilling plan and ensure plan adherence. It may further improve collaboration and coordination by directing the relevant information to the right people, at the right time, and always in the right context. Since workflows are curated centrally by the system, step-by-step activity plans are automatically generated for individual operations teams to keep all teams aligned. With all well construction activities from tripping to cementing continually monitored and dynamically updated with the latest operational activity, the operations team is always up to date.

The integration of all data into one system by utilizing relevant downhole tool data and surface measurements combine to make the best use of the information available. Step-by-step simplified workflows, reduction of human dependencies, and transformation of how directional and data services are delivered, enable a consistent approach.

Drilling operation applications are revolutionizing drilling operations through cloud-edge integration and AI-driven automation. Many drilling operation applications provide real-time connectivity and data-driven insights, but lack advanced analytical tools and domain-specific knowledge integration. Operators need enhanced decision-making capabilities to handle complex queries and to access both unstructured and structured data efficiently.

In the drilling industry, timely and accurate information is crucial for operational efficiency, safety, and decision-making. Personnel such as company men, drilling engineers, and rig operators need immediate access to operational data to assess whether drilling is on track and to identify any disturbances that may impact progress. Challenges that are prevalent in drilling operations may include delayed information retrieval, namely traditional systems may not provide immediate access to the latest operational data, causing delays in decision-making. Additionally, data is often spread across multiple systems and formats, making it difficult to quickly gather a comprehensive operational picture. Other challenges may include identification and management of drilling disturbances. Drilling operations can face various disturbances that need prompt attention, for example a stuck pipe where the drill string becomes immobilized in the wellbore and halt operations, lost circulation where drilling fluids are lost to the formation thereby affecting pressure control, or wellbore instability where formation collapse or swelling can cause wellbore degradation. Additionally, further disturbances may include equipment failure or other malfunctions in drilling equipment can lead to downtime, drill string vibrations where excessive vibrations can damage equipment and reduce drilling efficiency, formation pressure issues where unexpected high-pressure zones can lead to kicks or blowouts, deviations from a planned trajectory where the drill bit strays from the planned well path, mud contamination where contaminants affect the properties of drilling mud and impact performance, hole cleaning problems where inefficient removal of cuttings can cause blockages, and torque and drag issues where increased resistance may affect drilling efficiency and equipment lifespan. Another possible challenge encountered during drilling operations involve timely decision-making under pressure. For example, operational pressure resulting from costly drilling operations and where delays can have significant financial impacts. Additionally, delayed responses to disturbances can endanger personnel and the environment and thereby raise the relevant safety risks. Personnel should therefore rapidly assess situations to make informed decisions. Further challenges include limited integration of domain knowledge where procedures, best practices, and domain knowledge are often documented in unstructured formats and are not readily accessible during operations, therefore resulting in knowledge gaps and less experienced personnel lacking the domain-specific insights needed to handle complex situations. Another frequently encountered challenge is inefficient communication or siloed teams which is the result of a lack of real-time information sharing between rig site and office-based teams which hampers collaboration and promotes miscommunication where information may be lost or misunderstood due to ineffective communication channels. Additionally, drilling operations can lead to data overload where information overwhelms operators who receive vast amounts of data without effective tools to filter and prioritize information. Receipt of overwhelming amounts of data can lead to difficulty when analyzing trends and identifying patterns or anomalies over time without advanced analytical tools.

What is needed is a system and method which provides operators with the enhanced decision-making capability to handle complex queries and the ability to access both unstructured and structured data efficiently.

SUMMARY

According to certain embodiments, a method and system is provided for developing a drilling assistant within a drilling operation application. A comprehensive knowledge graph may be constructed from both unstructured and structured data sources and a Retrieval Augmented Generation (RAG) system may be implemented atop this graph. By providing an augmented interactive and AI driven chatbot with advanced analytics and domain-specific insights, the current invention may improve decision-making processes in drilling operations.

According to certain embodiments, the current disclosure includes a method providing advanced analytics and domain-specific insights related to a site. The method includes receiving data related to the site, building a graph database from the received data, and querying the graph database. The method also includes generating a response based on the query and displaying the generated response within a graphical interface on a screen.

In certain embodiments, a computing system is provided which includes one or more processors and a memory system having one or more non-transitory computer-readable media storing instructions that, when executed by at least one of the one or more processors, cause the computing system to perform operations. The operations may include receiving data related to a site, building a graph database from the received data, and querying the graph database. The operations may also include generating a response based on the query, displaying the generated response within a graphical interface on a screen, and performing a site action based on the displayed response.

In certain embodiments, a non-transitory computer-readable medium storing instructions is provided that, when executed by one or more processors of a computing system, cause the computing system to perform operations. The operations include receiving data related to a site. The received data may include structured data and unstructured data. The structured data may be received from a wellsite. The structured data may include rig information, event tracking usage, and service information. The unstructured data includes data retrieved from procedure documents, drilling domain knowledge documents, and application programming interface or event definition documents. The operations further include building a graph database from the received data. The graph database includes a plurality of nodes. Rig information, event tracking usage, and service information may each form at least one node within the graph database. The operations may also include querying the graph database. Querying the graph database may include inputting a natural language query into a chat interface portion of a graphical interface by a user, processing the input query using natural language understanding to identify at least one entity within the input query, and retrieving data from the graph database relevant to the identified entity. The operations may further include generating a response based on the query. The response may be generated using a retrieval augmented generation system. The generated responses may include a text response and/or a visualization response. The visualization response may include an interactive plot or diagram. The operations may include displaying the generated response within a graphical interface. The generated response may be displayed in a chat interface portion of the graphical interface. The operations may further include performing a site action based on the displayed response. Performing the site action may include generating or transmitting a signal that instructs or causes an action to occur. The action may include a physical action. The physical action may include selecting where to drill a wellbore in the subsurface formation, drilling the wellbore, varying a trajectory of the wellbore, varying a weight or torque on a drill bit that is drilling the wellbore, varying a rate or concentration of a fluid being pumped into the wellbore, or a combination thereof.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 11 illustrates a graphical interface displaying a document generated by the current method which details the steps included for resolving a firewall anomaly, according to an embodiment.

FIG. 15 illustrates a graphical interface of an example of a generative AI agent executing the current method, according to an embodiment.

FIG. 16 illustrates a graphical interface of an example of a generative AI adding a firewall, according to an embodiment.

FIG. 20 illustrates an exemplary generation of a cypher query by a graph sub-agent, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

System Overview

Figure 1:
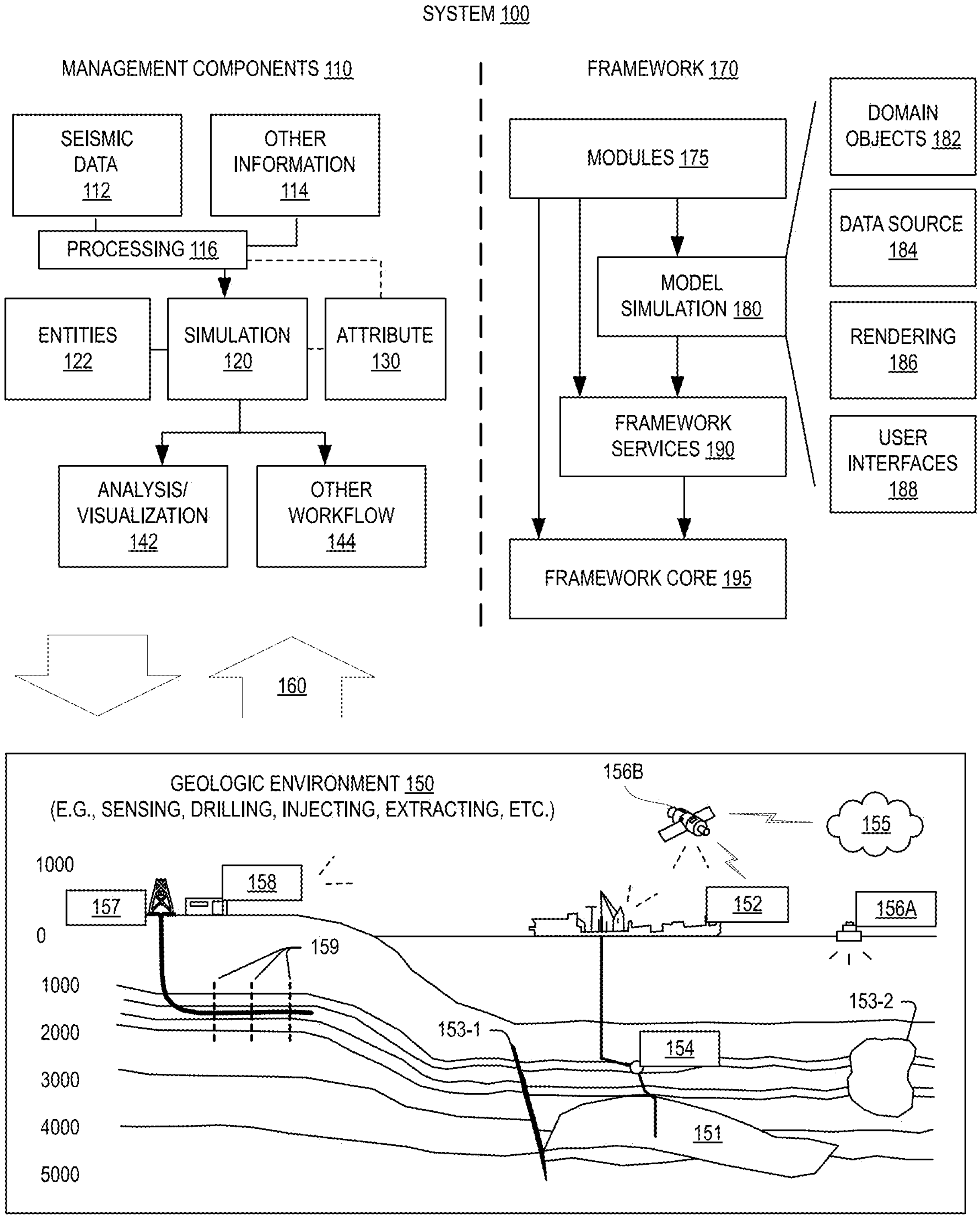
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET® framework (Redmond, Washington), which provides a set of extensible object classes. In the NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156A may be located remote from a well site and include sensing, detecting, emitting or other circuitry. Such equipment may include storage and communication circuitry to store and to communicate data, instructions, etc. As an example, one or more satellites 156B may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Method and System for an AI-Powered Drilling Assistant Using Knowledge Graphs and Retrieval Augmented Generating During a Field Operation The current disclosure is related to an agentic RAG framework which addresses the limitations frequently encountered in the field by introducing a multi-agent orchestration design and leveraging a fine-tuned knowledge graph. This knowledge graph acts as a unified schema model, consolidating data from diverse sources and providing a global view of the data ecosystem. By integrating this with the RAG framework, the system may deliver real-time, context-aware insights tailored to the specific needs of stakeholders in rig operations. These stakeholders may include company men, drillers, remote operation engineers, and decision-makers. By simplifying data access and enhancing contextual understanding, the framework may foster more informed and efficient decision-making across the domain.

Drilling operations may involve highly complex workflows that rely on real-time data acquisition, aggregation, and interpretation to ensure safe and efficient execution. Data generated during drilling may be collected from various sources, such as Measurements While Drilling (MWD), surface sensors, Bottom Hole Assembly (BHA) tools, and trajectory monitoring systems. This data may then be transmitted to remote servers or WITSML (Wellsite Information Transfer Standard Markup Language) servers, which adhere to established energy standards for data exchange. WITSML may provide domain-specific schemas to structure and transfer data, enabling interoperability across different software and tools in the drilling ecosystem.

The aggregation process may consolidate data from multiple streams, such as drilling logs, well trajectories, and sensor readings, into centralized workflows. In certain embodiments, MWD data includes formation evaluation metrics like gamma ray and resistivity, while surface sensors may capture torque, pressure, and rotation speed. These data streams may be pushed to WITSML servers in real-time to facilitate remote monitoring and decision-making.

Traditional BI solutions rely heavily on data pipelines and aggregation workflows to process this data into actionable insights. These pipelines often involve multiple processing layers and platforms to integrate data from disparate sources. However, building and maintaining such workflows require deep domain knowledge of the underlying data sources and schemas. This complexity often necessitates collaboration between data engineers and domain experts, as traditional analytics engineers may lack the necessary expertise in drilling-specific data standards such as WITSML. As a result, these workflows tend to be static and difficult to extend. Any new requirements, such as adding a new data source or creating a custom workflow, may require additional resources and time to design, implement, and validate. This not only increases operational costs but also delays the availability of insights. Despite recent advancements, many BI platforms still struggle to provide real-time adaptability and scalability, often relying on pre-defined dashboards and rigid workflows that are unable to meet the dynamic demands of modern drilling operations.

Retrieval-Augmented Generation (RAG) has emerged as a promising paradigm to address the limitations of traditional systems by integrating LLMs with information retrieval capabilities. LLMs have demonstrated remarkable potential for natural language understanding, summarization, and reasoning. However, their reliance on static pre-trained data limits their ability to generate accurate and up-to-date responses in dynamic industrial contexts. This gap in capabilities necessitated the introduction of RAG systems, which combine real-time data retrieval with generative models to provide relevant and context-aware responses.

Traditional RAG systems, while effective in specific use cases, are constrained by linear and static workflows. They lack the adaptability required for handling multi-step reasoning and complex task management. For example, a traditional RAG system might struggle to integrate data from multiple relational and graph-based sources while maintaining context across interactions. These challenges limit their scalability and applicability in industrial environments where dynamic decision-making is beneficial.

The evolution of RAG systems has introduced more sophisticated architectures, such as Graph RAG and Agentic RAG, to overcome these limitations. Graph RAG may leverage knowledge graphs to provide structured and relational context, addressing the issue of fragmented data and enabling more accurate retrieval. On the other hand, Agentic RAG systems incorporate agent-based patterns such as reflection, planning, and tool use, allowing for enhanced adaptability and multi-step workflows. These systems may employ AI agents that collaborate to perform complex reasoning and task execution, paving the way for more dynamic and interactive applications.

One key innovation in Agentic RAG is the convergence of agentic workflows with retrieval-augmented generation, which enables systems to adaptively select tools, collaborate across agents, and manage diverse data modalities. For example, agentic patterns can be applied to solve hybrid questions that involve both textual and relational data. By incorporating self-reflection and validation mechanisms, Agentic RAG systems can improve accuracy and reduce hallucinations, making them highly effective in industrial contexts.

In addition to enhanced reasoning capabilities, Agentic RAG systems also address scalability and latency issues by integrating hybrid indexing strategies, such as graph indexing and vector embeddings. This allows the system to perform efficient contextual integration and provide real-time insights. The combination of LLM-driven reasoning, graph-based contextualization, and agentic patterns represents a significant leap forward in the evolution of RAG systems, enabling their application in complex domains such as drilling operations, healthcare, and finance.

The dynamic and complex nature of drilling operations necessitates a system capable of integrating diverse data sources, providing real-time insights, and adapting to evolving operational demands. Drilling workflows generate a vast array of structured and unstructured data, including well, wellbore, rig, and operational context data. These are further enriched by domain-specific models, such as BHARUN (Bottom Hole Assembly Run) and tubular models, which describe the tools and configurations used during drilling operations. However, analyzing and correlating these data streams in real time poses significant challenges.

The Agentic RAG framework of the current disclosure addresses these challenges by combining LLM-driven reasoning with a graph-based knowledge model. This approach may enable the integration of fragmented data streams into a unified schema, allowing for efficient contextualization and multi-step workflows. By capturing both synchronous and asynchronous events, such as telemetry data acquisition, tool usage, and unexpected operational changes, the system may ensure that all relevant information is readily accessible to key stakeholders in real time.

According to certain embodiments, when performing automated steering tendency estimation, there may be a need for real-time analysis of drilling tendencies in order to optimize wellbore trajectory. A directional driller (DD) leveraging the Agentic RAG framework of the current disclosure may access real-time steering tendency metrics and then correlate them with BHARUN data to make trajectory corrections efficiently. The ability to dynamically expose and analyze key performance indicators (KPIs) such as steering tendencies and drilling trajectory metrics in one system removes the dependency on multi-modal statistical analysis, which is often cumbersome and static.

Furthermore, the integration of performance metrics for drilling operations underscores the role of KPIs in evaluating operational efficiency. The Agentic RAG system of the current disclosure may enable continuous monitoring and correlation of multiple KPIs, such as rate of penetration (ROP), tool wear, torque, and pressure. In certain embodiments, a remote operations engineer can dynamically assess how a drop in ROP correlates with an increase in torque or tool wear in real time. This real-time contextual analysis may allow for proactive interventions, reducing downtime and operational risks.

By consolidating data into a knowledge graph, the Agentic RAG framework provides a centralized and extensible model for exposing usage-based KPIs on demand. This adaptability can be used in the drilling domain, where operational conditions and requirements evolve rapidly. Unlike traditional systems that rely on static workflows and pre-defined dashboards, the Agentic RAG system evolves alongside the operation, offering insights tailored to specific user personas, including drillers, directional drillers, and remote engineers.

This capability significantly reduces the complexity of multi-modal analysis, as the system dynamically integrates and presents insights without requiring extensive manual intervention. By empowering stakeholders with real-time, context-aware insights, the framework enhances decision-making, operational efficiency, and safety, while reducing dependency on specialized statistical tools and workflows.

Figure 2:
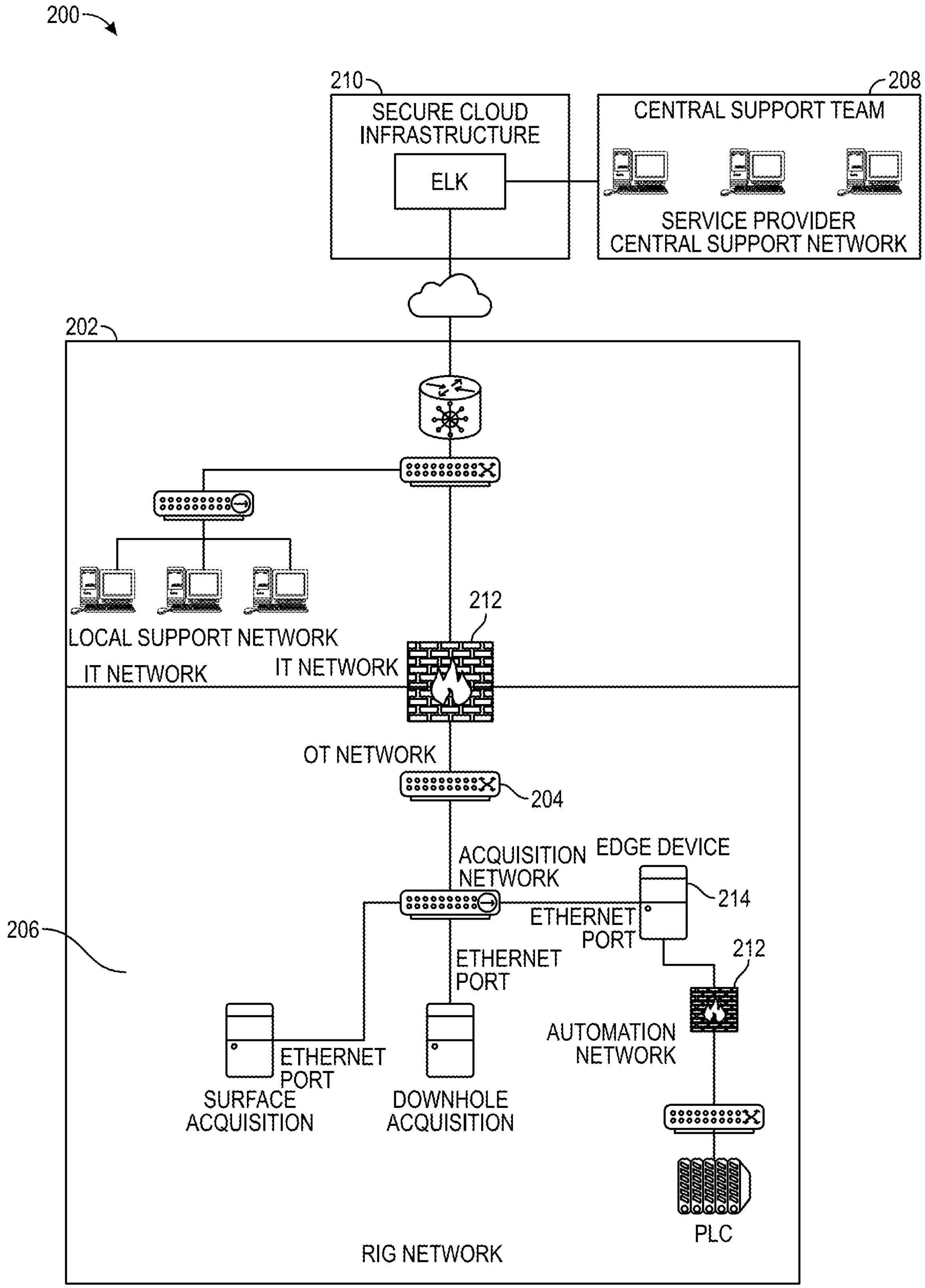
FIG. 2 illustrates a schematic diagram representing edge and cloud infrastructures for implementing the current method, according to an embodiment.

A network architecture 200 for drilling operations typically involves a multi-layered setup designed to handle the complexities of rig environments, as shown in FIG. 2. The network architecture 200 may be segmented into distinct network zones, such as an information technology (IT) network 202, an operational technology (OT) network 204, and a rig network 206, to ensure security and manageability.

The IT network 202 may include centralized support and monitoring systems 208, such as the Service Provider Central Support Network, which interacts with the rig networks 206 via secure communication channels 210. The OT network 204 may operate within a more restrictive environment, managing essential control systems and acquisition networks, including surface and downhole data acquisition devices. Each network segment is further isolated using firewalls 212 and hypervisor technologies, enabling network segmentation and perimeter security.

The rig network 206 connects edge devices 214, such as drilling control units, acquisition systems, and other wellsite equipment which perform various automation and data processing tasks. These edge devices 214 often operate with limited bandwidth, making it challenging to transmit large amounts of data in real time. Therefore, a robust strategy for monitoring and data collection is preferred to ensure efficient operation without overwhelming the network.

Figure 3:
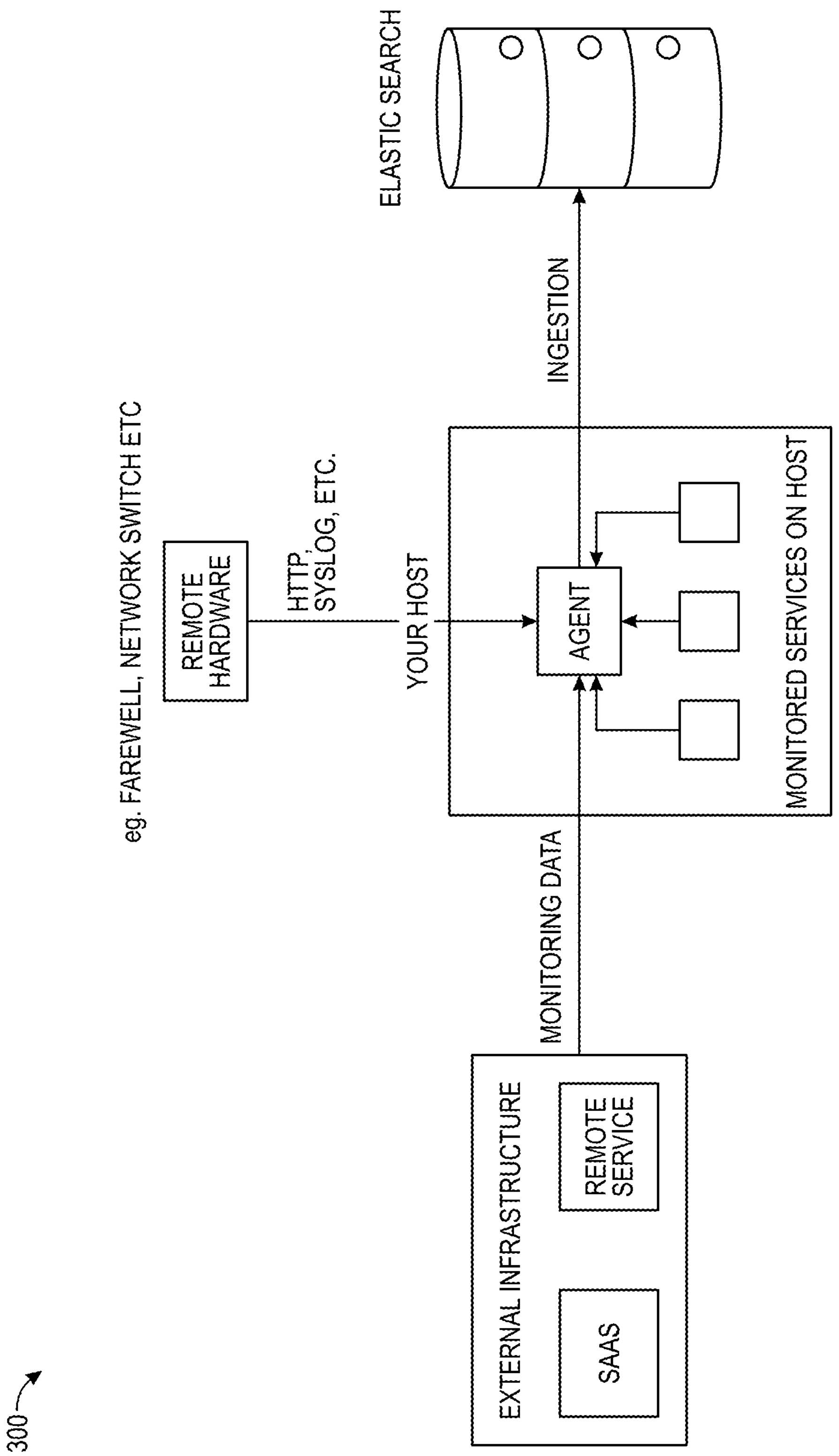
FIG. 3 illustrates a schematic diagram representing a ELK stack for implementing the current method, according to an embodiment.

To address the challenges associated with monitoring geographically distributed rigs and remote edge devices, a fleet management approach may be implemented. According to certain embodiments, a fleet management system 300 may be an Elasticsearch-Logstash-Kibana (ELK)-based fleet management system, or management systems provided by Datadog, NewRelik, Azure Arc, or Dynatrace. An ELK stack, for example as seen in FIG. 3, may enable comprehensive log and metric collection across all network layers. By integrating fleet management agents on edge devices, system and application logs, resource usage data, and network metrics can be gathered in real time. This setup allows the centralized support team or other users to proactively monitor the health and performance of the rigs.

The flexibility of fleet management is advantageous for operating in environments with constrained bandwidth. During field testing, metrics may be collected at carefully selected intervals to avoid excessive network load, ensuring compliance with Rig-to-Town latency requirements. For example, CPU metrics may be polled every 30 seconds, while memory and filesystem data were collected every 15 minutes, resulting in minimal traffic impact on the network.

The use of a fleet management system may also improve incident response capabilities by integrating alerting with tools like those provided by SaaS incident management platforms. This integration may enable the SRE team or other users to receive real-time alerts for anomalies or performance issues, allowing them to intervene proactively and prevent system downtime. The use of fleet monitoring tools in drilling operation and similar deployments indicates a shift towards more proactive support practices.

According to certain embodiments, logs are produced by software-driven applications running on various systems or devices to provide information that helps developers and system engineers analyze the system's condition and status. They may also serve as an audit trail, documenting events in chronological order. Log analysis is often used to investigate incidents related to the system, such as defects or unauthorized access. By examining the logs, investigators can reconstruct the sequence of events leading to a particular incident or event. Through this analysis, system engineers or investigators aim to identify unusual or suspicious activities. However, detecting these anomalies requires time and expertise in spotting irregularities within the vast number of log entries.

One objective of performing analysis on logs is to facilitate the detection of anomalous activities so that immediate or corresponding remediation may be done to contain or remediate the issue recorded in the logs. This is part of the attempt to enhance system resiliency against system faults, degradation and intentionally induced cyber physical attacks. It may also be used to facilitate the investigation or analysis of what may have induced the occurrence of such anomalous activities. Due to the characteristics of logs, namely being voluminous, varied, and contextual, regular log analysis is difficult, warranting the need for automation. While rule or signature-based automation solution helps, the contextual or semantic complexity of logs limits its efficacy.

There are many AI algorithms for log analysis. Traditional AI algorithms, such as Support Vector Machines (SVM), have been applied for anomaly detection tasks. However, these methods have several challenges and constraints to deal with before they contribute significantly to their intended objectives of keeping system resilient. For supervised models, there is the challenge of acquiring sufficient anomalous data points to train such models. For unsupervised models, it will be the ability to detect the variety and variations of anomalies in logs.

In contrast, embedding models may offer a more resource-efficient solution for log anomaly detection on edge devices. According to certain embodiments, embedded models may be able to transform unstructured log data into meaningful multi-dimensional vectors (embeddings) that capture semantic meanings within the logs, making it easier to detect deviations that indicate potential anomalies. One of the strengths of embedding models is their efficiency in real-time applications. Given the constrained computational resources, especially on edge devices with limited GPU capacity, embedding models offer a lightweight solution that processes data with reduced overhead. This may enable real-time anomaly detection, which is crucial in industrial environments where immediate detection and response are required to maintain system reliability and prevent failures. Moreover, with transformer-based architectures, it maintains historical data with memory capability to enhance their understanding of contextual information within logs.

By directly utilizing embedding models at the edge or wellsite, systems can detect anomalies without the latency typically associated with cloud-based detection, allowing for faster responses and reducing operational risks. This approach is particularly valuable in resource-constrained environments, where bandwidth limitations make transferring large volumes of log data impractical. Instead of sending all logs to a central system, the anomaly detection process at the edge or wellsite filters out normal activity, allowing only abnormal logs to be transmitted for further analysis by the SRE team. This strategy may not only conserve network bandwidth but may also ensure that issues are prioritized and addressed promptly.

Figure 4:
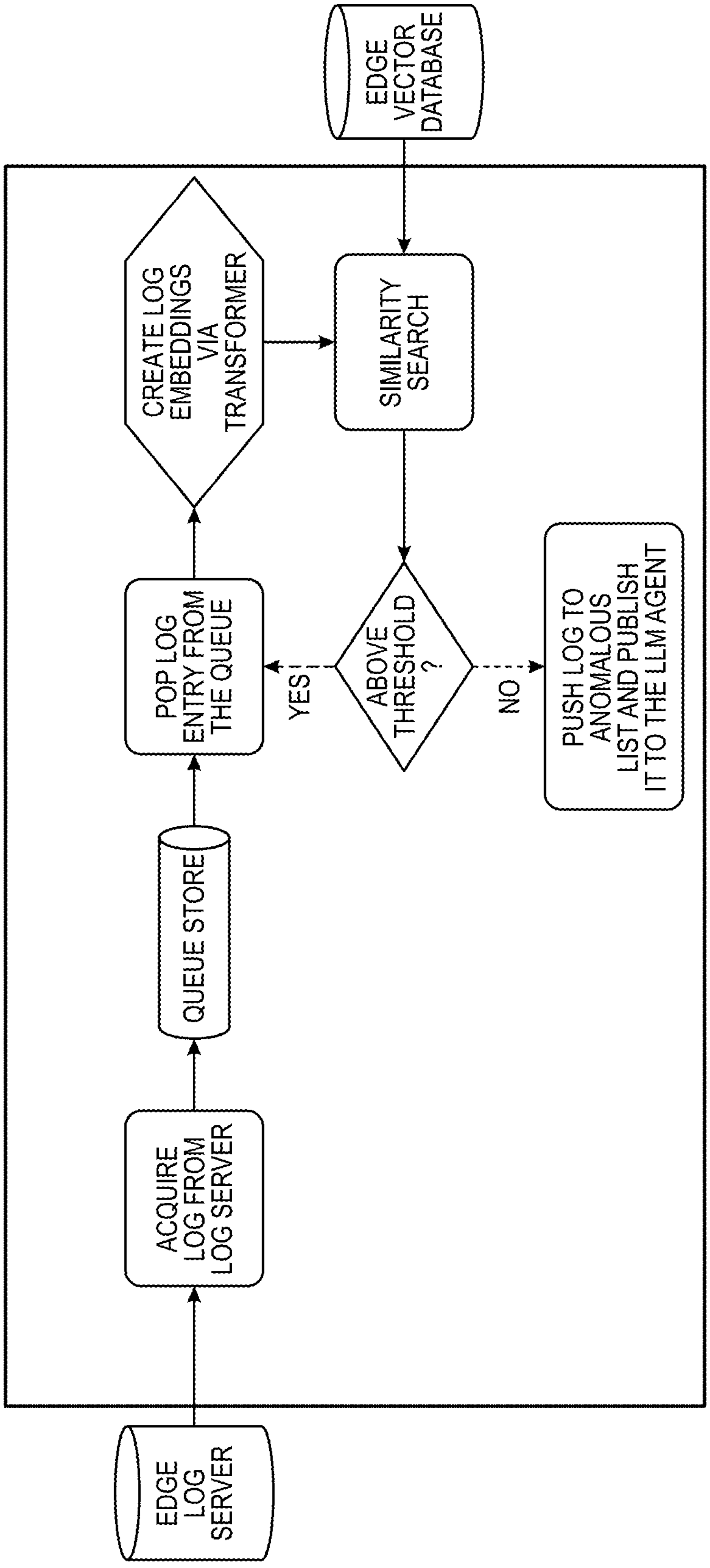
FIG. 4 illustrates a flowchart for detecting an anomaly using the current method, according to an embodiment.

As shown in FIG. 4, a producer-consumer pattern may be employed to decouple log input and processing tasks, enhancing both scalability and efficiency. According to certain embodiments, a detection service may read logs in real time from various sources, including application logs, system logs, and firewall logs. The service may continuously processes these logs, leveraging an embedding model to compare real-time log entries against a baseline of normal log embeddings stored in a vector database. If the calculated distance between a real-time log and its corresponding normal log exceeds a predefined threshold, the log is flagged as an anomaly.

In certain embodiments, the architecture may minimize the need for extensive data preprocessing or log parsing, allowing for efficient and robust detection. By filtering out normal logs locally and only sending identified anomalies to a remote health monitoring platform, the solution may reduce bandwidth consumption and ensures that significant events receive timely attention. The combination of embedding models and vector databases provides a powerful, scalable framework for real-time anomaly detection at the edge or wellsite.

According to certain embodiments, creating vector embeddings from logs involves several steps including transforming the unstructured or semi-structured text in logs into meaningful vectors that can be stored and queried efficiently in a vector database. In certain embodiments, the process to create vector embeddings from logs includes preprocessing the logs, choosing or training a text embedding model, storing embeddings in a vector database, and querying and using the embeddings.

Because software logs are often messy, containing timestamps, error codes, messages, stack traces, etc., preprocessing is helpful when removing unnecessary noise and focusing on useful information. Preprocessing may also include removing timestamps, special characters, and other irrelevant metadata. Logs typically contain timestamps, host details, etc., which may not be useful for embeddings. In certain embodiments, preprocessing includes tokenization or the splitting of the logs into tokens such as words or phrases, and word removal so as to remove common words like "the", "is", etc., if they do not add meaning to the log content. In certain embodiments, preprocessing may also include lowercasing which is the conversion of all text within the logs to lowercase for uniformity.

According to certain embodiments, choosing or training a text embedding model includes choosing or training an embedding model that can convert the processed log data into vector embeddings as needed. In certain embodiments, the model encodes the log entries into vector embedding representations using a pre-trained embedding.

Figure 5:
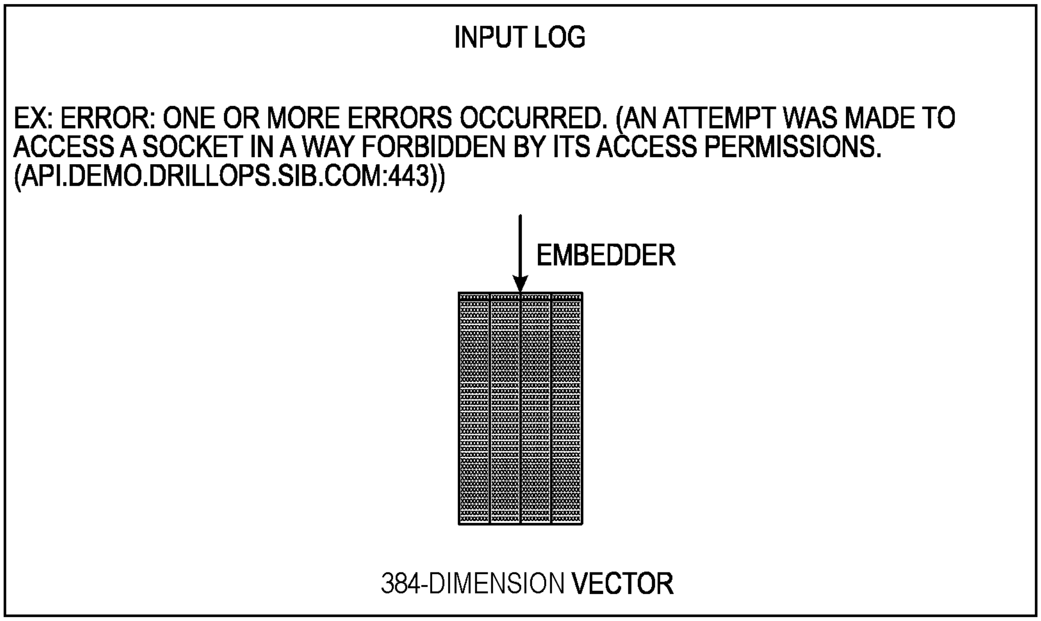
FIG. 5 illustrates a schematic diagram representing how a log is embedded into a 384-dimension vector, according to an embodiment.

Table 1 below shows the comparison between the models in the state of the art. Based on the performances of the models based on average performance, speed, and model size, it was found that using all-MiniLM-L6-v2 is suitable, according to an embodiment. FIG. 5 further shows an example of embedding a log into 384-dimension vector according to an embodiment.

TABLE 1

| Model Name | Performance Sentence Embeddings | Performance Semantic Search | Avg. Performance | Speed | Model Size |
|---|---|---|---|---|---|
| all-mpnet-base-v2 | 69.57 | 57.02 | 63.30 | 2800 | 420 MB |
| multi-qa-mpnet-base-dot-v1 | 66.76 | 57.60 | 62.18 | 2800 | 420 MB |
| all-distilroberta-v1 | 68.73 | 50.94 | 59.84 | 4000 | 290 MB |
| all-MiniLM-L12-v2 | 68.70 | 50.82 | 59.76 | 7500 | 120 MB |
| multi-qa-distilbert-cos-v1 | 65.98 | 52.83 | 59.41 | 4000 | 250 MB |
| all-MiniLM-L6-v2 | 68.06 | 49.54 | 58.80 | 14200 | 80 MB |

Once embeddings are generated, a vector database is required to store them for fast retrieval and similarity search. Popular vector databases include Pinecone, Weaviate, or Milvus, however other vector databases may be used, according to certain embodiments.

Once the embeddings are in a vector database, a similarity search can be performed using vector-based computation to find logs that are semantically similar to a given log, detect anomalous patterns by comparing log embeddings to expected behaviors, and categorize logs based on embedding proximity.

Figure 6:
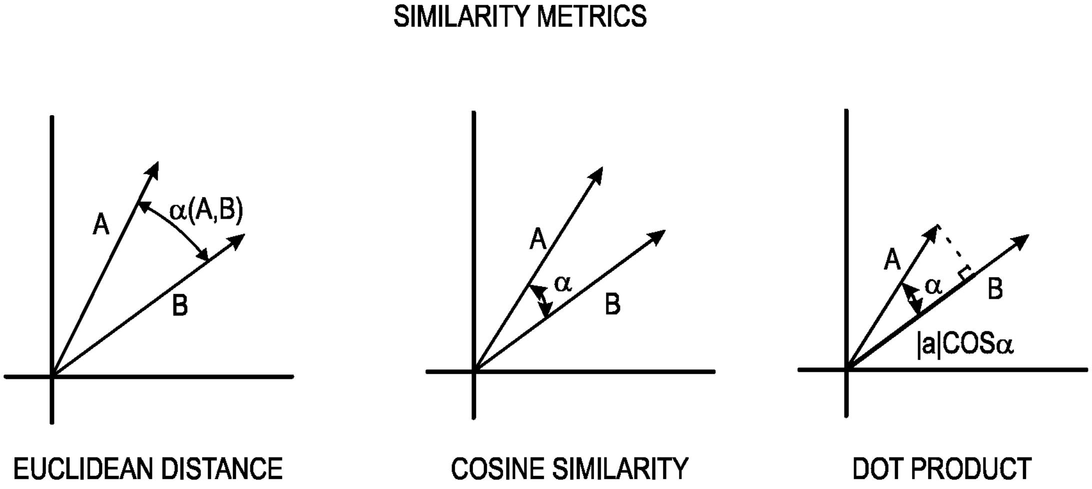
FIG. 6 illustrates a series of plots for a variety of different similarity metrics used by the current method, according to an embodiment.

According to certain embodiments, the current invention may use a similarity search to detect log anomalies. In one embodiment, the store is a vector database which contains normal log entries. The input log is vectorized using an embedded model, which transforms it into 384-dimension embeddings that capture semantic relationships between log data. According to certain embodiments, the embedded model may be any appropriate model including the models listed in Table 1. These vector representations are then compared with stored normal log vectors using similarity search techniques. If a queried log entry deviates significantly from the stored normal entries, it is detected as anomalous. To compare these embeddings, certain similarity metrics are used, depending on the nature of the data and the specific problem being solved. Many different similarity metrics such as Cosine Similarity, Dot Product, Euclidean Distance, and Manhattan Distance may be used. FIG. 6 shows several examples of different similarity metrics.

Figure 7:
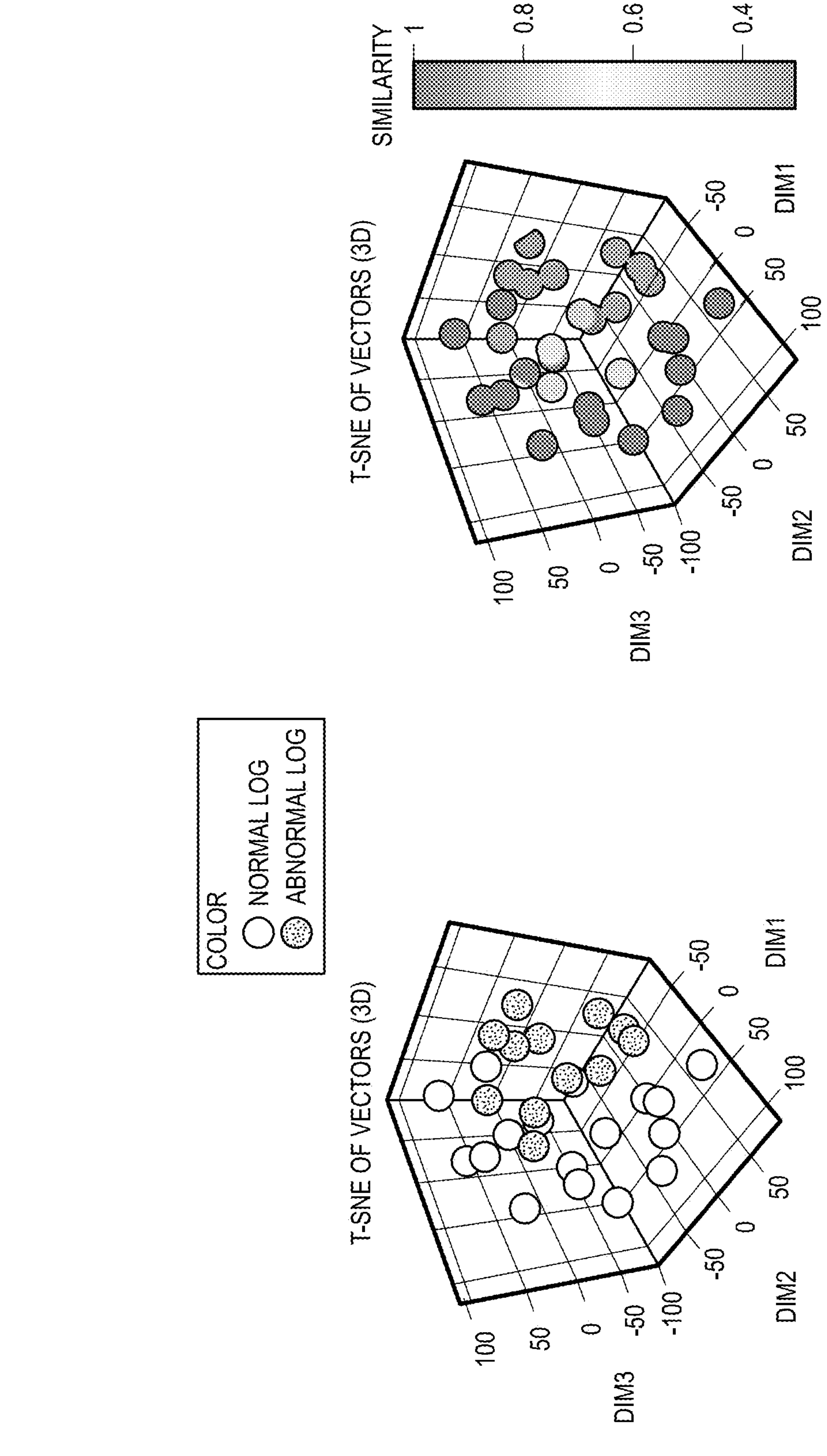
FIG. 7 illustrates a series of t-distributed Stochastic Neighbor Embedding (t-SNE) plots of the normal and abnormal logs used by the current invention, according to an embodiment.

According to certain embodiments, the Euclidean distance similarity metric is preferably used. The similarity score may be computed through Euclidean distance between the incoming log embeddings against normal log embeddings stored in the vector database. When the similarity score matches the criteria such as highest similarity score or minimal threshold score, an anomalous log is detected. FIG. 7 shows the t-distributed Stochastic Neighbor Embedding (t-SNE) plots of the normal and abnormal logs. The similarity score demonstrates the differences between normal logs and anomalies, according to an embodiment.

Figure 8:
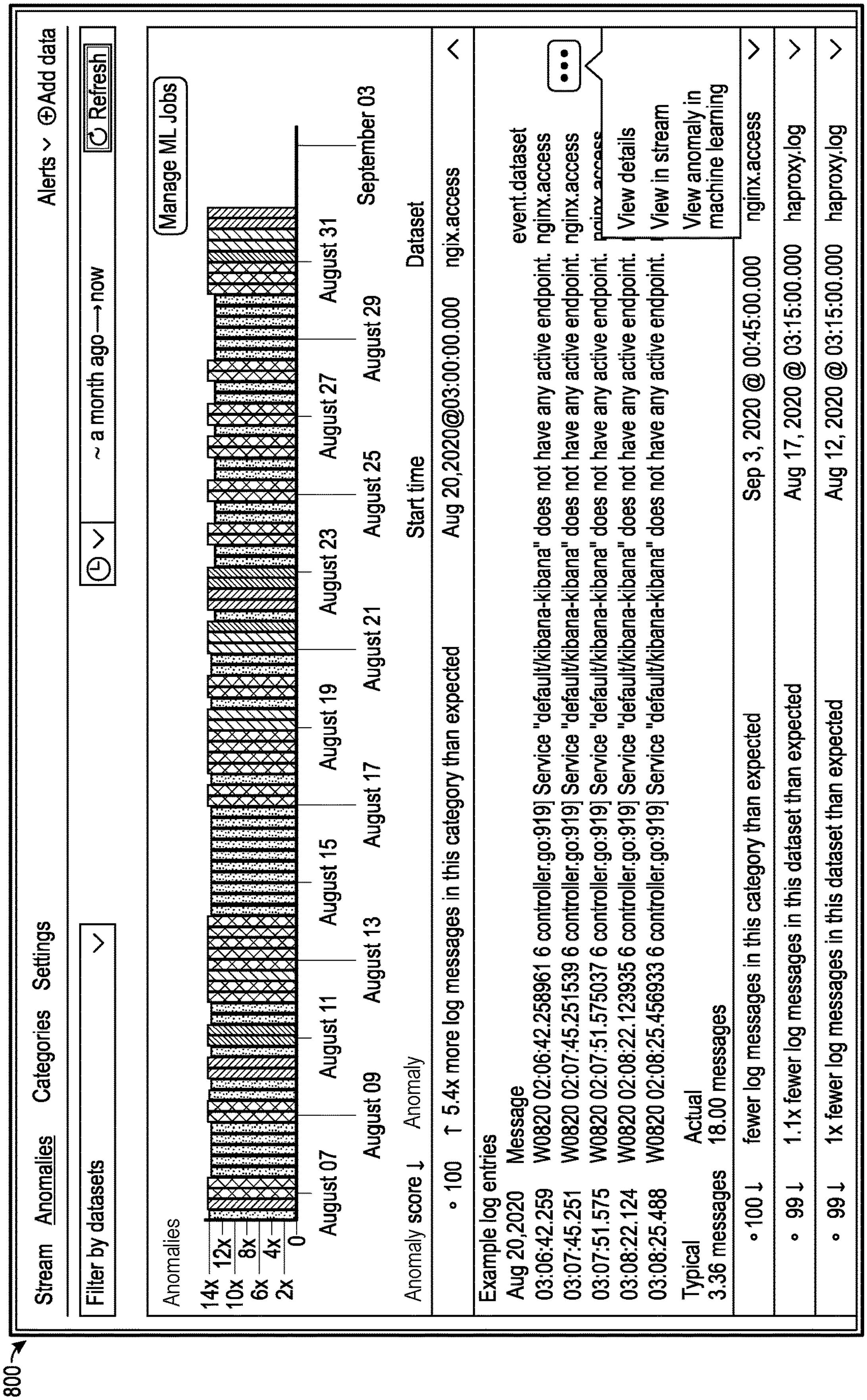
FIG. 8 illustrates a graphical interface displaying the results of an anomaly detection process performed by the current method, according to an embodiment.

According to certain embodiments, the fleet management system among other monitoring tools may be used to monitor a system's metrics such as CPU usage, memory usage, disk space, and network traffic in real-time. By visualizing these metrics in dashboards presented within a graphical interface 800, for example as seen in FIG. 8, performance bottlenecks, resource constraints, and anomalies may be detected. In certain embodiments, the fleet management system may also enhance security by analyzing logs from firewalls, intrusion detection systems (IDS), and other security tools, and correlating real-time logs or alerts to identify potential security incidents, such as unauthorized access attempts, malware, and suspicious network activity.

Figure 9:
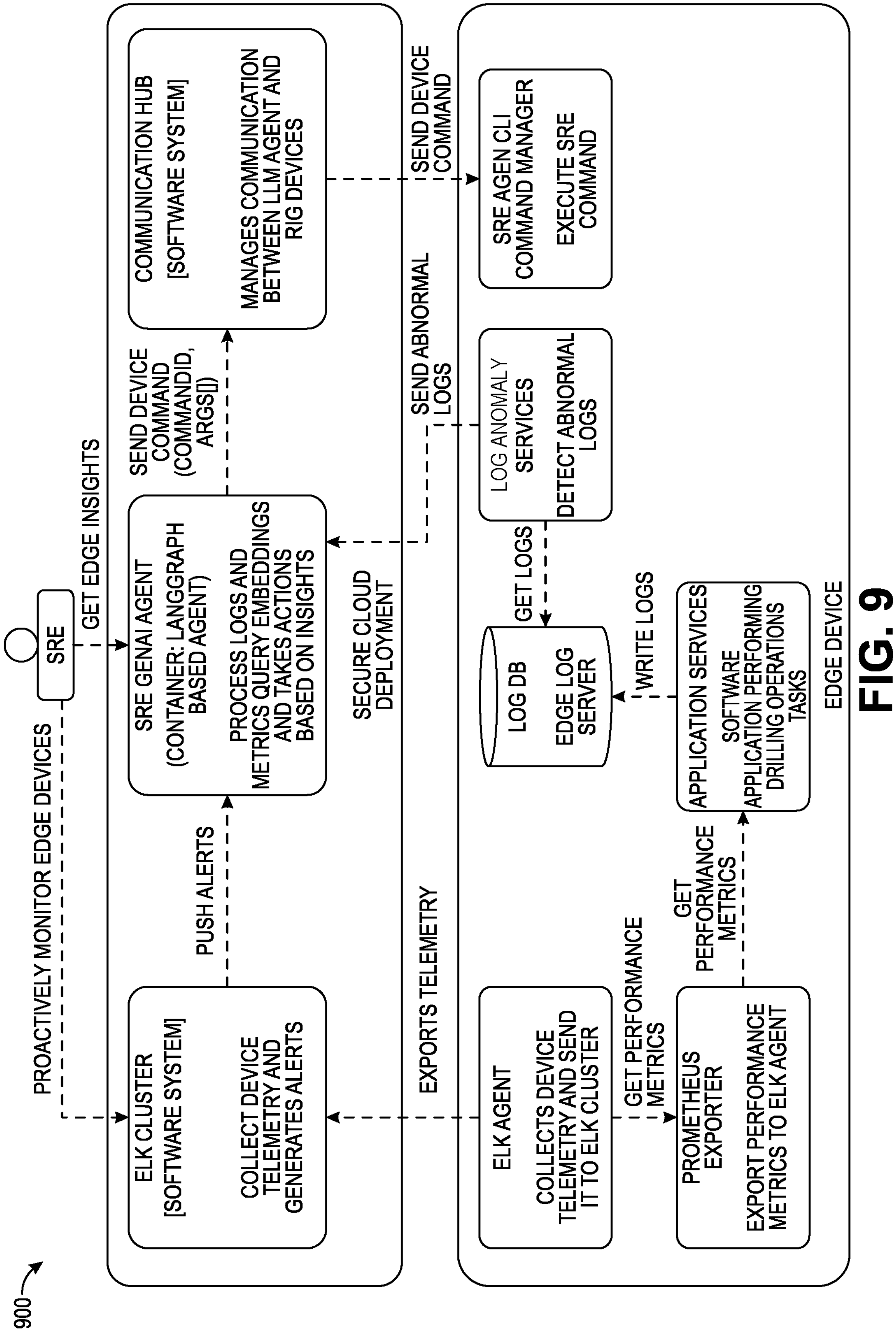
FIG. 9 illustrates a schematic diagram of an architecture of the autonomous anomaly detection and resolution process performed by the current method, according to an embodiment.

According to certain embodiments, the current invention may include LLM GenAI agents to generate actions to be sent through communication infrastructure to the edge devices. An example architecture 900 of the autonomous anomaly detection and resolution solution of the current disclosure may be seen in FIG. 9, according to an embodiment.

Figure 10:
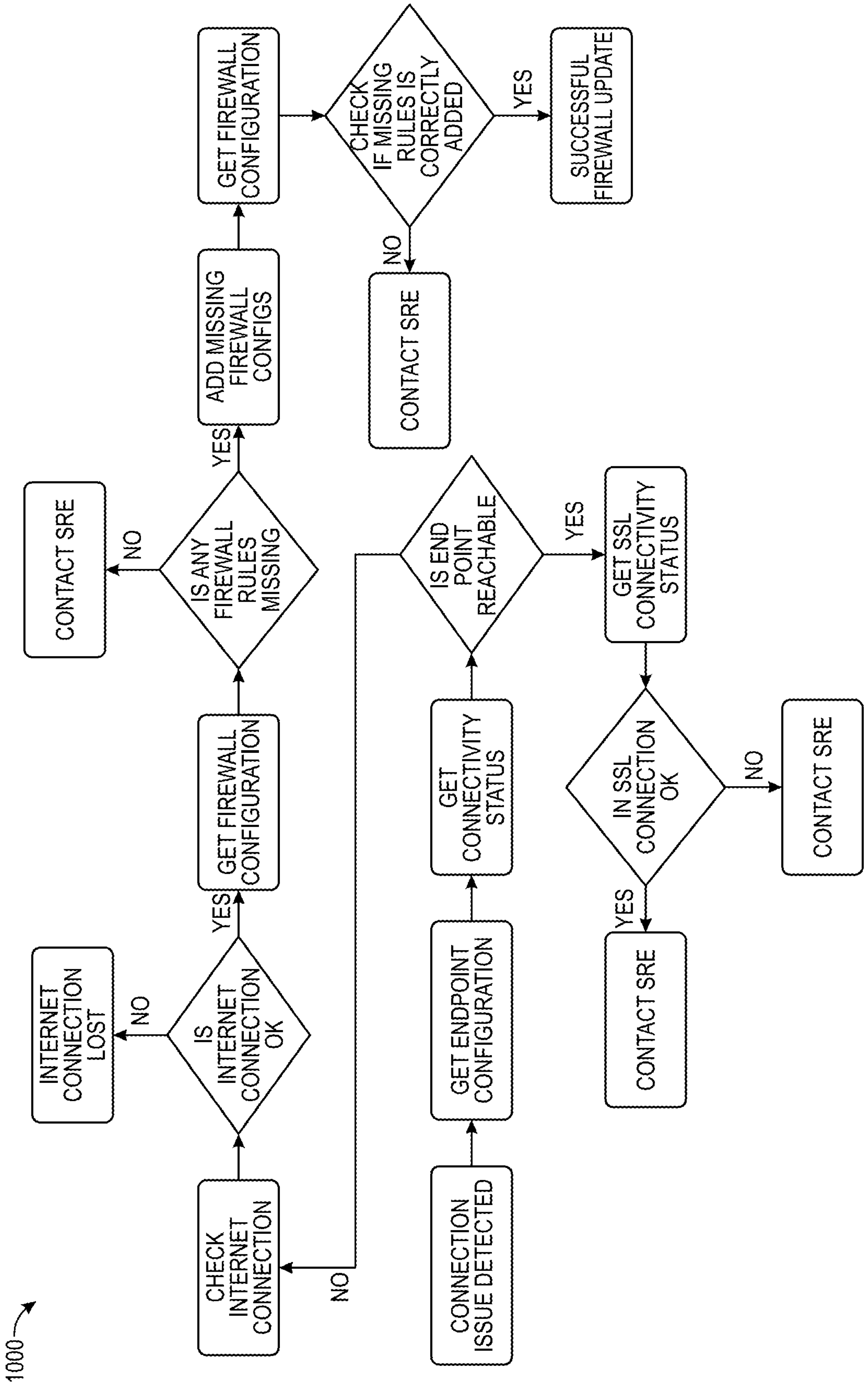
FIG. 10 illustrates a flowchart for resolving a firewall anomaly used by the current method, according to an embodiment.

Procedures may serve as systematic, step-by-step instructions aimed at resolving specific errors in an efficient and structured manner. The creation of such procedures typically starts with the development of a flowchart, where each block may represent conditions, execution steps or results, providing a clear roadmap for decision-making and action sequences. FIG. 10 shows an example of a procedure flowchart 1000 to solve a firewall issue, according to an embodiment. Following the flowchart design, a detailed document is crafted that outlines the objectives, such as the error types and step-by-step instructions. These steps may specify the condition statement and corresponding actions, which can be defined as function calls. FIG. 11 shows an example of a procedure document, according to an embodiment.

According to certain embodiments, the LLM agent can intelligently analyze the procedure's condition, identify the necessary logic, and execute the correct steps. Instead of manually coding extensive logic for each scenario, the LLM may autonomously determine the appropriate logic pathways, reducing the need for complex, hardcoded solutions and software development time.

To enhance accessibility and streamline the retrieval of relevant procedures, a vector database in certain embodiments may be utilized to store these procedure documents, enabling fast and efficient retrieval. By leveraging similarity search algorithms, the system can identify and recommend the most relevant procedure by comparing the characteristics of the queried error with stored procedures. This not only improves the precision and speed of error resolution but also reduces system downtime and minimizes development complexity, as the LLM can efficiently deduce logic and execute the necessary steps without the need for extensive, manual intervention.

Figure 12:
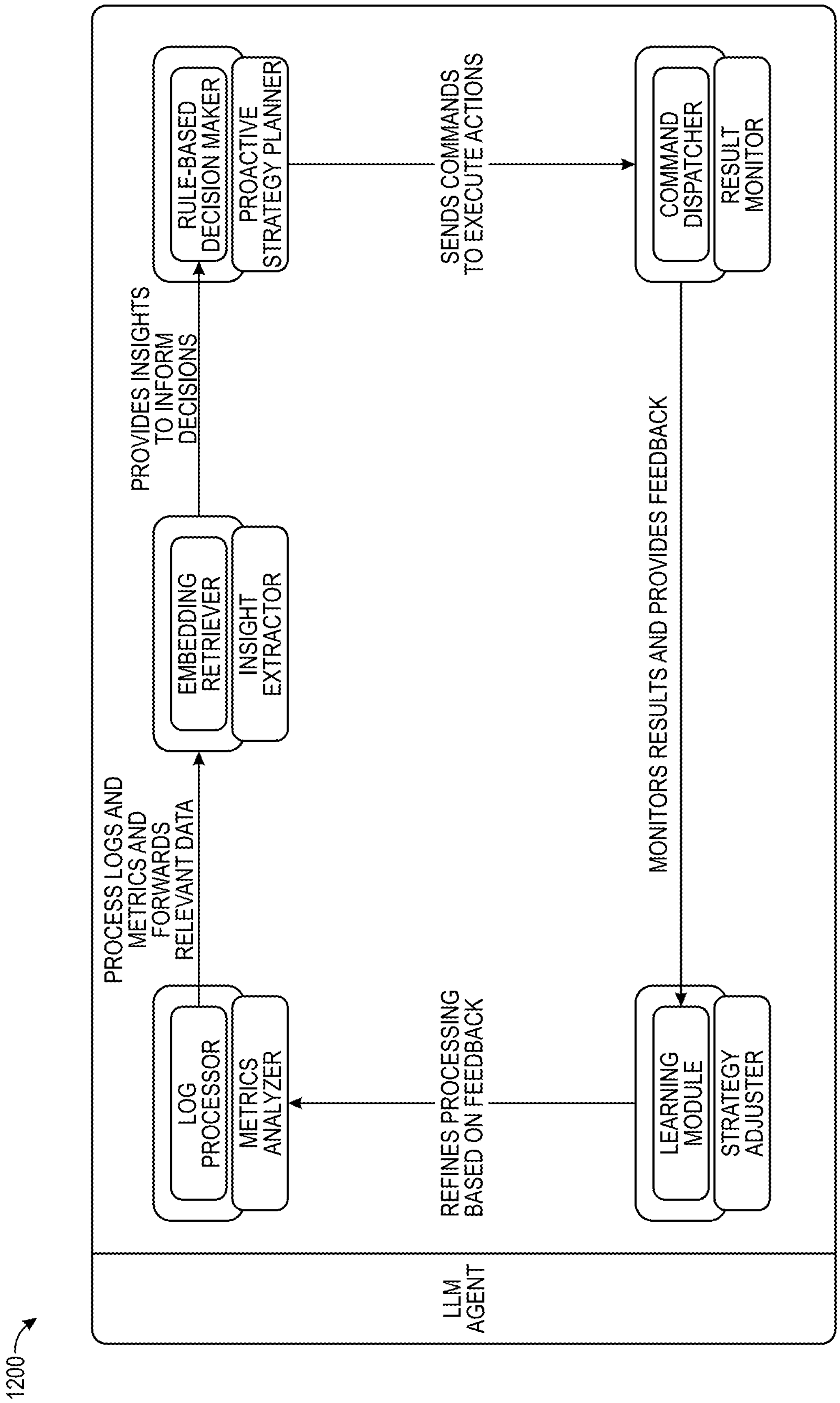
FIG. 12 illustrates a flowchart of a large language model used by the current method, according to an embodiment.

According to certain embodiments, LLMs are one type of AI model that may leverage deep learning techniques and transformer architectures to understand and generate human-like text. These models are trained on vast datasets, enabling them to grasp context, semantics, and intricate language patterns, which facilitates a wide range of applications, from text generation to conversational agents. According to certain embodiments, the LLM architecture 1200 may be as seen in FIG. 12 where the LLM-powered agent may generate actions based on the insights. In certain embodiments, there may be several LLM-powered agents, each specialized in a specific field. For example, the current invention may include a LLM-powered agent to detect operational issues (high latency, high load . . . etc.) and execute actions such as service restart and another LLM-powered agent to detect security threats and execute actions such blocking access and change the firewall configurations.

Figure 13:
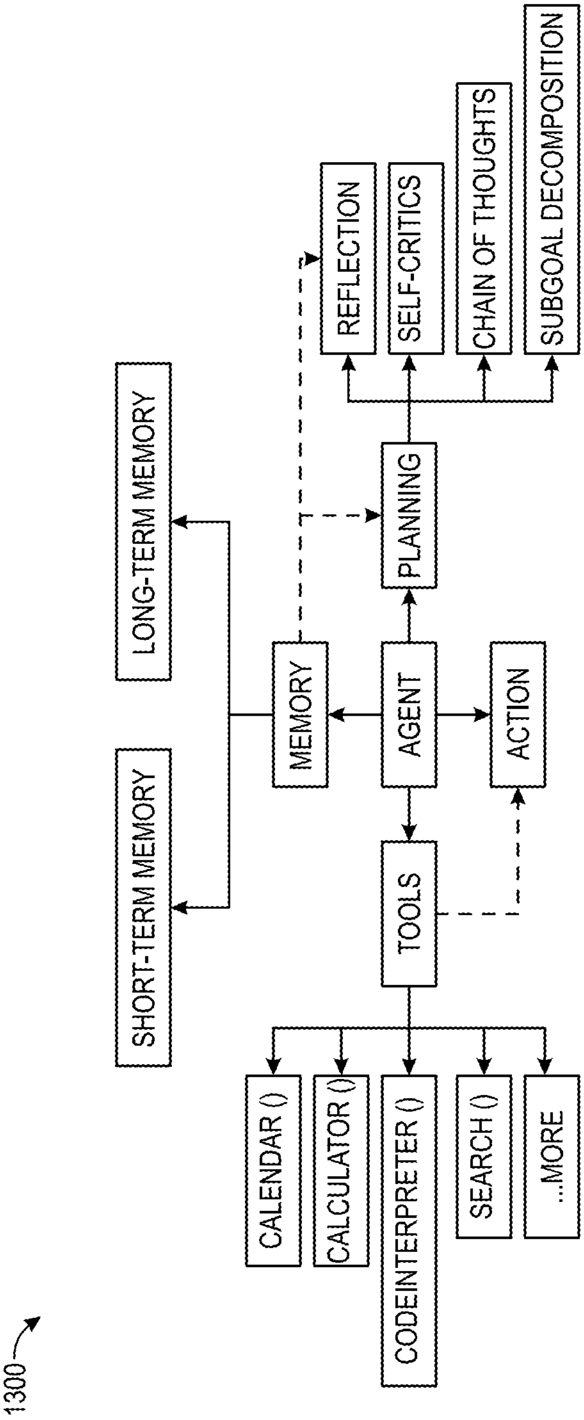
FIG. 13 illustrates a schematic diagram of a large language model powered agent used by the current method, according to an embodiment.

In certain embodiments, an LLM-powered agent may extends their capabilities by autonomously interacting with users and systems to perform complex tasks. This includes not only generating responses based on user inputs but also analyzing data, drawing inferences, and making decisions based on contextual understanding. The versatility of LLM agents can enable them to enhance productivity and efficiency through automation and intelligent problem-solving. FIG. 13 describes an overview of an example of a LLM powered agent 1300, according to an embodiment.

According to certain embodiments, in an LLM-powered autonomous agent system, the LLM-powered agent functions as the "brain" and may be complemented by several key components including self-organizing, memory, and tool use.

In certain embodiments, larger tasks can be systematically broken down into smaller, manageable subgoals (subgoal decomposition enabling more efficient execution by following user-defined procedures) with each step designed to address specific issues under predetermined conditions. A LLM agent possesses the capability to autonomously analyze task logic and make informed decisions for executing the appropriate steps. This approach may facilitate the efficient handling of intricate tasks, allowing agents to execute complex operations with greater precision. Furthermore, agents may engage in self-criticism and self-reflection regarding their past actions, enabling them to learn from mistakes and refine their strategies for subsequent steps. This reflection and refinement process significantly enhances the quality of results produced by the agent.

According to certain embodiments, an LLM-powered agent may employ in-context learning to utilize short-term memory, allowing for immediate adjustments based on recent experiences. In addition, the integration of long-term memory capabilities equips the agent with the ability to retain and recall vast amounts of information over extended periods. This is often achieved using external vector stores, facilitating rapid information retrieval and enhancing the agent's knowledge base.

According to certain embodiments, the LLM-powered agent can interact with external Application Programming Interfaces (APIs) to perform actions defined by the user. This functionality encompasses a wide range of tasks, including but not limited to retrieving current information, executing code, and performing external operations.

Figure 14:
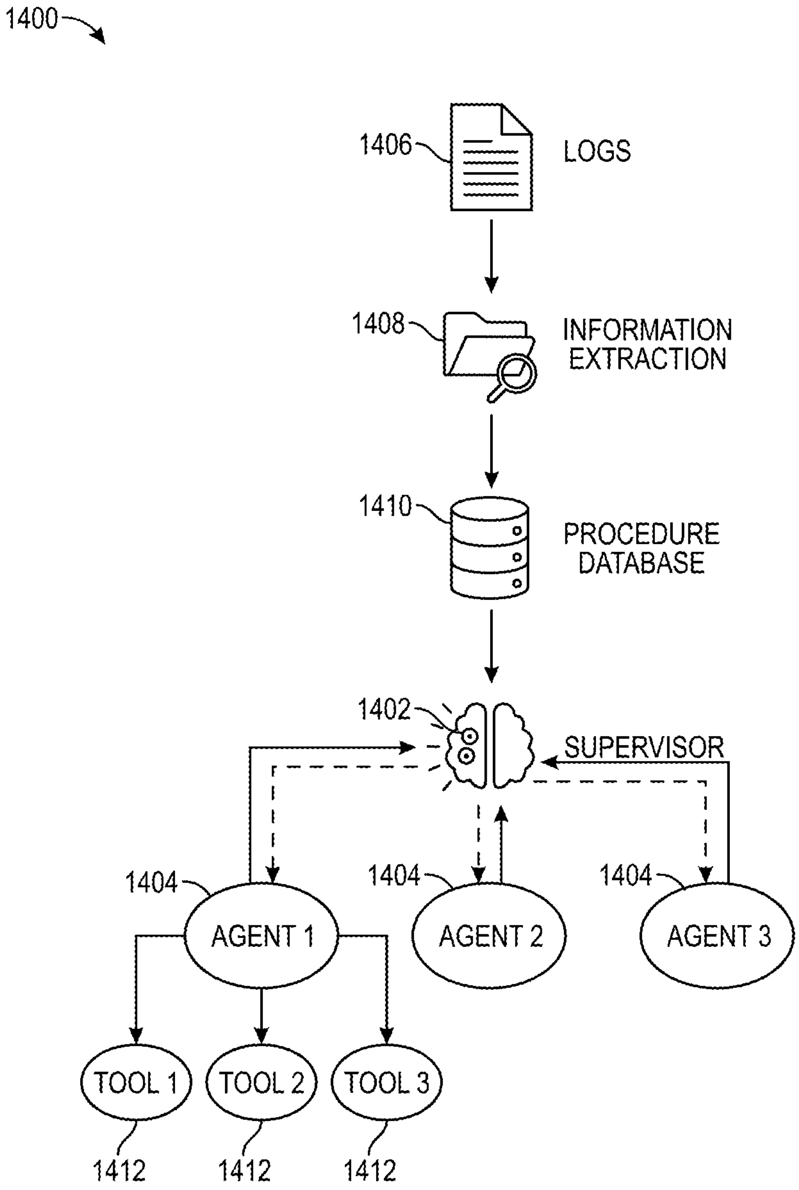
FIG. 14 illustrates a schematic diagram of the architecture of the current method employing a large language model powered agent, according to an embodiment.

According to certain embodiments, the current invention includes an LLM-powered autonomous agent system 1400 that incorporates a supervisor 1402 and specialized agents 1404 to optimize task execution. FIG. 14 shows the architecture of the LLM-powered agent system 1400, according to an embodiment. The supervisor 1402 may be a type of LLM-powered agent that plays a role by analyzing incoming procedures and determining the most appropriate specialized agent to handle the tasks. Once the routing decision is made, the designated specialized agent 1404 receives the procedure, executes the corresponding actions in accordance with predefined steps, and generates the output. This result may then be sent back to the supervisor 1402, who compiles the response and delivers it to the end user.

Specifically, in certain embodiments, upon receiving an abnormal log 1406 from the log anomaly detection service, an LLM may be employed to extract key information 1408, such as exceptions, from the log in order to diagnose the issue. The appropriate resolution procedure may then be retrieved from a procedure database 1410 using a similarity search. In certain embodiments of the current LLM-based agent system 1400, a LangGraph may be utilized to manage the coordination, task assignment, and overall workflow among LLM agents. More specifically, each LLM agent, such as the supervisor 1402, may be represented as a node within the graph structure, where task assignments are regulated by conditional edges linking the supervisor 1402 to nodes for each of the specialized agents 1404. The supervisor 1402 may assign the retrieved procedure to the designated specialized agent 1404. This specialized agent 1404 may be equipped with a set of tools 1412 specific to the issue. For instance, in the case of a firewall issue, the agent 1404 can perform actions such as retrieving firewall configuration or checking connectivity status, which are implemented as Python functions. The agent 1404 may execute the procedure step by step to resolve the issue. Upon completion, the results may be reported back to the SRE team through the supervisor 1402, facilitating full automation of the issue resolution process, according to an embodiment. This hierarchical structure, combining a supervisory decision-making layer with specialized execution capabilities, ensures efficient task allocation and precise execution, thereby enhancing overall system performance and reliability.

Like any connected industrial system, automation brings many advantages and improvements in terms of efficiency and performances, however many industrial systems need to be operational all the time and risks of cyber-attacks increase. For example, many digital drilling systems require real-time operations with minimal latency. Implementing cybersecurity measures that introduce delays can be unacceptable, thus limiting the range of possible security solutions. Additionally, ensuring availability and reliability is paramount, sometimes leading to trade-offs where security measures are deprioritized. Increased remote access capabilities for maintenance and monitoring introduce new vectors for cyber-attacks. Secure remote access solutions are not always implemented, leading to potential vulnerabilities. Industrial environments (for instance drilling systems) often lack the advanced monitoring and detection capabilities found in modern IT systems. Incident response can be slower due to the nature of industrial processes and the potential safety implications of shutting down operations. Furthermore, physical access to drilling systems can compromise cybersecurity. Protecting the physical infrastructure from tampering is crucial but can be challenging in dispersed or remote locations.

According to certain embodiments, the current disclosure aims to reduce the unnecessary presence of personnel, thereby reducing HSE risk exposure and optimizing operational costs. The current disclosure enables reduced staffing levels on mechanized rigs and delivers unparalleled consistency of repetitive tasks, helping users reach their technical limit on every well.

According to certain embodiments, system metrics related to a wellsite are collected from edge device rigs and sent to a fleet management system in real-time. Abnormal logs may be detected by a log anomaly detection service and then sent to a LLM agent system. A GenAI agent may then process abnormal log data by extracting the key relevant information, then an embedder may be used to generate embeddings. Specifically, in certain embodiments, the GenAI agent may analyze logs and performance metrics from edge devices or wellsite equipment and use embeddings from the fleet management system to understand context and enhance prompts. In certain embodiments, the GenAI agent may perform actions such as testing network and SSL connections, opening firewall rules, and providing user prompts.

In certain embodiments, a closely relevant procedure may be extracted from the procedure database through a similarity search and then passed to a GenAI supervisor.

In certain embodiments, the current invention includes performing a query and response, namely that the SRE or user queries the GenAI agent for specific insights or logs. The GenAI agent system may then retrieve and process the necessary data from the fleet management system, providing the required information to the SRE. According to certain embodiments, the GenAI supervisor may assign tasks to a number of specialized agents based on the retrieved procedure. Each of the GenAI agents may then perform the tasks, and the result is then sent back to the GenAI supervisor. In certain embodiments, based on insights the GenAI agent system may send commands to the communication hub. The communication hub in turn may forward these commands to the edge device such as wellsite equipment, which executes the commands.

With the usage of edge computing services rising in the oil and gas industry, the demand for an effective monitoring and alerting system became noteworthy. The introduction of the current invention marks a significant enhancement in service delivery, as it enables SRE teams to monitor an edge fleet and be alerted in real-time. The current invention may drastically reduce the incidence of NPT. The current invention may case deploying, configuring, managing fleet monitoring agents, logging, and storing device telemetry. In certain embodiments, the current invention may enable fast troubleshooting supported by intuitive visualizations. On top of this foundation, the current invention introduces AI-powered enhancements that take observable solution capabilities to the next level. For example, by analyzing firewall logs, the current system can autonomously detect abnormal network activities suggesting an intrusion attempt and automatically block the hacker's connection. Similarly, according to certain embodiments, an unexpected increase in the volume of data written to the system due to internal logs may trigger an anomaly alert, prompting proactive data management actions such as archiving or deleting old logs. These AI-driven innovations aim to further minimize future NPT by ensuring that operational anomalies are not just detected but resolved autonomously. The current invention represents a breakthrough towards operations with minimal human intervention. In the following section, some use cases of the proposed solution are highlighted.

According to certain embodiments, the current invention may be used in operational issue detection and resolution. For example, when an edge device or wellsite equipment is experiencing high latency and load and affecting drilling operations, a GenAI agent specialized in operational issues may analyze the performance metrics and identify the high latency and load. In certain embodiments, the GenAI agent may send a generated command or insight via a communication hub to the edge device or wellsite equipment to restart specific services with the aim of reducing the load and latency. According to certain embodiments, the current invention may be used to adjust resource allocations or prioritize certain tasks to balance the load. In certain embodiments, the system performance may be restored without manual intervention, ensuring minimal disruption to drilling operations at the wellsite.

According to certain embodiments, the current invention may be used in security threat detection and mitigation. For example, when suspicious network activity is detected or when a potential security breach is suggested, a GenAI agent which is specialized in security, analyzes firewall logs and IDS alerts to confirm suspicious activities. According to certain embodiments, the GenAI agent may send commands to block the malicious IP address and tighten firewall rules in order to prevent unauthorized access. The GenAI may also initiate a thorough network scan to identify any additional vulnerabilities or threats. In certain embodiments, the security threat is neutralized swiftly thereby protecting the integrity of the drilling operations and preventing data breaches.

According to certain embodiments, the current invention may be used to address network connectivity issues. For example, when a rig-to-town connection is unstable which then causes data transmission delays and potential operational inefficiencies, a GenAI agent may identify repeated connection errors and latency spikes from the logs. In certain embodiments, the GenAI agent may also test network and SSL connections to diagnose the root cause of the instability as seen in FIG. 15. In certain embodiments, the GenAI may adjust network settings or open necessary firewall rules to stabilize the connection as seen in FIG. 16. In certain embodiments, the network connectivity is restored, thereby ensuring continuous and reliable data transmission between the rig and the town operations center.

According to certain embodiments, the current invention may be used to perform database cleanup. For example, when a database on an edge device is filling up rapidly, thereby risking data overflow and operational disruptions, a GenAI agent may monitor the database size and identify a rapid increase in data volume. In certain embodiments, the GenAI agent may send a command via the IoT or communications hub to the edge device or wellsite equipment to perform a cleanup operation. In certain embodiments, the GenAI agent may identify and archive old logs or unnecessary data to free up space in the database, and may also adjust data retention policies to prevent future overflows. In certain embodiments, the database space may be reclaimed, thereby preventing potential data loss or operational disruptions due to a full database.

Method and System for a Drilling Assistant Using Knowledge Graphs and Retrieval Augmented Generation During a Field Operation According to certain embodiments, the current invention provides an AI-powered drilling assistant which may leverage graph databases, vector databases, and a Retrieval Augmented Generation (RAG) system to provide advanced analytics, domain-specific insights, and interactive visualizations within a drilling operations application.

In certain embodiments, the system may collect unstructured data, for example PDFs, text files, articles, and procedural documents, and structured data, for example rig information, event tracking, and service metadata, from various sources.

According to certain embodiments, unstructured data may be organized into categories, namely procedure documents such as text files containing standard operating procedures and guidelines, drilling domain knowledge documents such as PDFs and articles providing domain-specific insights and best practices, and application programming interface (API)/event definition documents such as JSON or YAML files containing API definitions and event descriptions.

Figure 17:
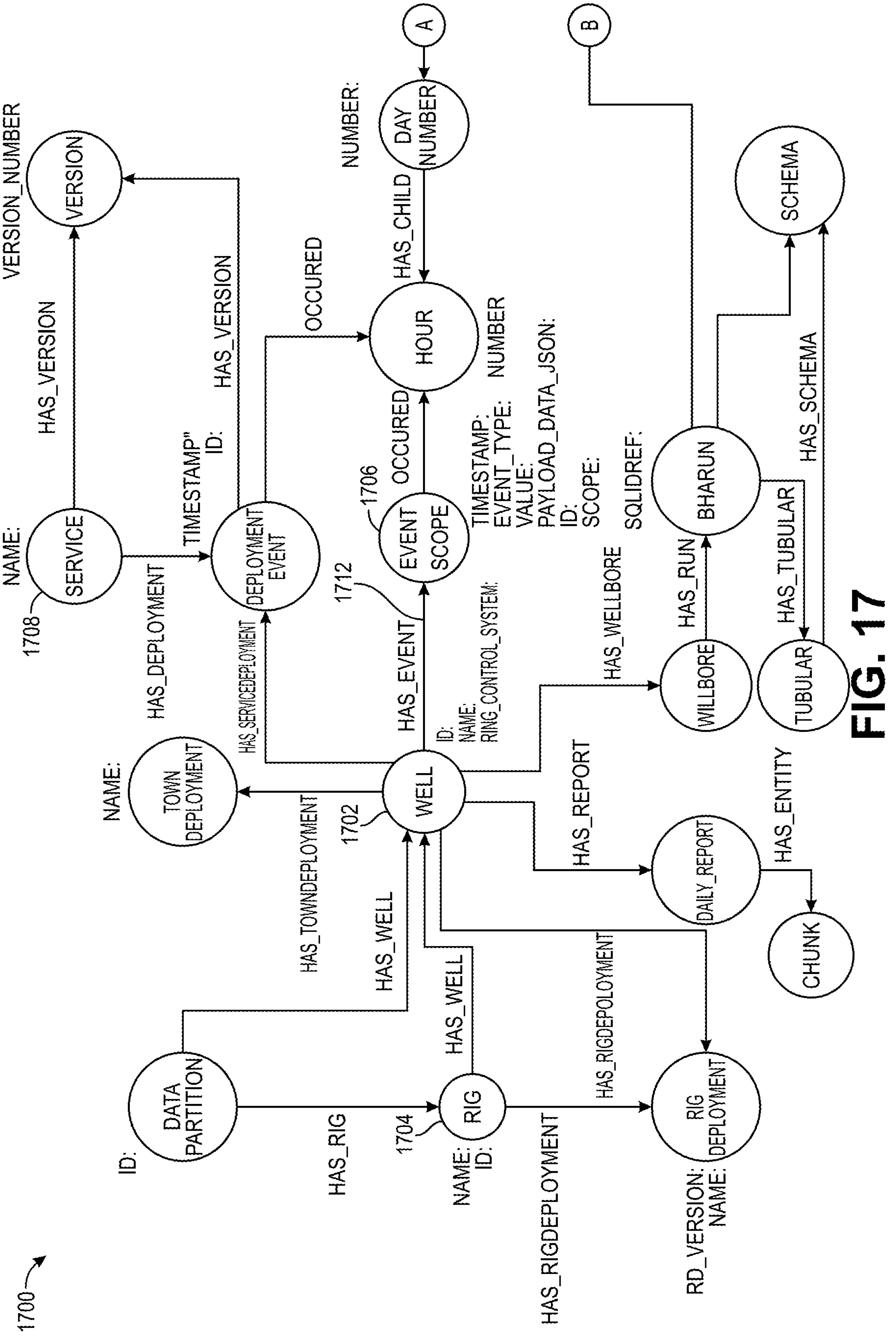
FIG. 17 illustrates an example of a knowledge graph generated from received structured and unstructured data, according to an embodiment.
Figure 17:
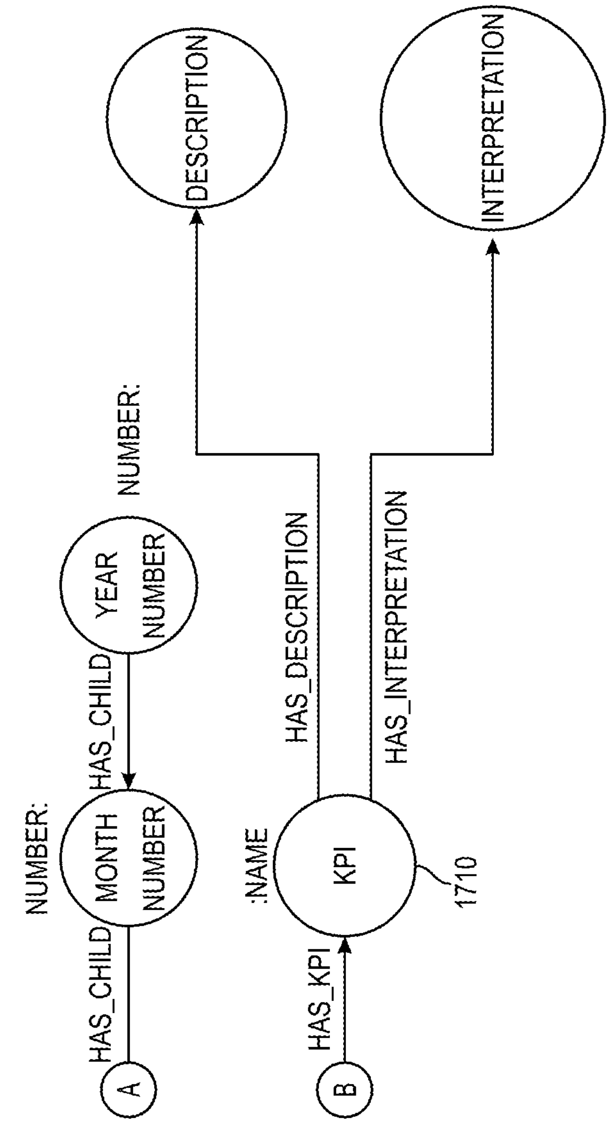

The data may then be integrated into a knowledge graph 1700 as seen FIG. 17 to model relationships within the data ecosystem. The use of a knowledge graph database allows for efficient querying and retrieval of interconnected data, enabling the system to handle complex queries that span multiple data types and sources. In certain embodiments, the knowledge graph 1700 may be central to the agentic RAG framework, providing a unified schema that integrates domain-specific data with event-driven insights. This ontology may be designed to address the complexity of drilling operations by combining structured and dynamic data elements, facilitating real-time decision-making and efficient data retrieval. In certain embodiments, key entities and relationships within the knowledge graph 1700 seen in FIG. 17 may include a well node 1702 representing individual drilling sites with attributes such as depth, status, and geographic location. The well node 1702 may act as a hub connecting related operational and event data. A rig node 1704 may capture operational details about the equipment, its configuration, and associated deployments. An event node 1706 may tracks telemetry data, equipment usage, and anomalies. Events may be categorized into operational, maintenance, and exception events, each linked to their respective wells or rigs. A service node 1708 may be included which represents deployment details, tool usage, and maintenance records, enabling analysis of operational efficiency. An KPI (Key Performance Indicator) node 1710 may be included to track metrics like Rate of Penetration (ROP) and Downlink Execution Time, offering performance insights into drilling operations. In certain embodiments, the links or relationships between the nodes of the knowledge graph 1700 may include HAS_EVENT 1712 for connecting wells or rigs to events for tracking operational history, DEPLOYED_ON for linking rigs to wells to provide deployment context, and TRACKS for associating services with their respective KPIs and performance metrics.

According to certain embodiments, the knowledge graph 1700 may integrate domain-specific data with event-driven tracking to capture the dynamic nature of drilling operations. For example, directional drilling relies heavily on telemetry data from tools such as RSS (Rotary Steerable System) and MWD (Measurement While Drilling). Events such as Downlink Configuration Changes or Steering Adjustments are logged and linked to specific wells, providing granular insight into operational performance. Each event may be enriched with metadata such as timestamps, container IDs (e.g., Wellbore ID), and operational context, enabling advanced querying and analytics.

In certain embodiments, KPIs may be used for evaluating the performance of drilling operations. The knowledge graphs 1700 may include dynamic KPI tracking to provide real-time insights into metrics. For example, Rate of Penetration (ROP) measures the drilling speed, calculated as the depth drilled per unit of time. ROP may be influenced by factors such as tool efficiency, formation characteristics, and operational decisions. By integrating ROP into the knowledge graph, users can identify performance bottlenecks and optimize drilling strategies. In certain embodiments, downlink execution time may tracks the time taken to execute commands sent to downhole tools, providing insights into operational efficiency and tool responsiveness.

In certain embodiments, the knowledge graph 1700 delivers several advantages over traditional relational data models. For example, the knowledge graph 1700 may provide unified data access by combining domain and event data into a single, queryable schema, eliminating the need for complex joins and static pipelines. The knowledge graph 1700 may also provide real-time insights by enabling dynamic queries, such as retrieving ROP trends or identifying wells with configuration anomalies. The knowledge graph 1700 may also provide extensibility, namely the knowledge graph 1700 may easily accommodate new entities, relationships, and KPIs, ensuring adaptability to evolving operational requirements. The knowledge graph 1700 may lay the foundation for integrating advanced analytics and RAG systems, enabling stakeholders—from field engineers to executives—to make informed decisions in real time.

According to certain embodiments, the current invention may implement ingestion and utilization of structured data which is crucial for providing accurate, real-time insights into drilling operations. The system may manage three primary types of structured information including rig information, event tracking usage, and service information. By integrating these data types into the knowledge graph 1700, the assistant can perform complex queries and generate detailed analyses, enhancing operational efficiency and decision-making.

In certain embodiments, the rig node 1704 may include detailed metadata about the drilling environment and equipment. This may include identifiers and descriptors such as the well ID, rig ID, well name, rig name, device name, and versions of the software and rig control systems in use. By ingesting this data, the system can contextualize operational queries and provide specific insights related to particular rigs or wells. For example, the system may collect data fields such as but not limited to ContainerId which represents the well ID, RigId which is a unique identifier for the rig, WellName and RigName which are the descriptive names for the well and rig, DeviceName which is the name of the device or equipment in use, RDVersion which is the version of the rig data software currently in use, ProductType which may specify whether the product is a drilling operations platform or application or another system, and RigControlSystem Version which is a version of the rig control system driver currently in use. By incorporating this information into the knowledge graph 1700, the assistant can answer queries like “Which rigs are using Rig Control System version X?” or “Provide the operational status of Rig Y,” according to certain embodiments.

In certain embodiments, the event node 1706 may include capturing and analyzing events related to application usage and drilling operations. This data provides insights into user interactions, system performance, and operational anomalies. Key fields within even tracking usage may include EventType which is a type of event occurring, such as configuration changes, connection events, or protocol activities, Value which is a specific value or status associated with the event, PayloadDataJson which is structured data containing additional details about the event, Scope which is the application or system component raising the event, and EventTime which is a timestamp indicating when the event occurred. By ingesting this data, the assistant can monitor and analyze operational events, enabling it to detect patterns, identify anomalies, and provide proactive recommendations. For example, it can respond to queries like “How many connection failures occurred in the last 24 hours?”, “Are there any recurring configuration issues affecting performance?”, “How many new steering tendencies estimated and how it performed against last 5 surveys”, or “How much time/footages the well is drilled with fully autonomous drilling?”, according to certain embodiments.

In some embodiments, the service node 1708 may include metadata about the services running within the drilling operations, such as service names, versions, and start times. This data helps in monitoring the health and performance of various services used in drilling operations. Key data fields within service information may include ServiceName which is a name of the service, ServiceVersion which is a version of the service currently being deployed, and StartTime which is the time when the service was initiated. Integrating service information allows the assistant to track the status of services and alert operators to any issues. It can answer questions like “Which services are currently running on Rig Z?”, “Has Service A experienced any downtime recently?”, “Does this rig have the latest version of service X?”, “What’s new in this service version compared to the previous version”, or “What’s the next version available and what will be the additional features?”, according to certain embodiments.

Additionally, vector databases may be used to store embeddings of unstructured data, enhancing semantic search capabilities and improving the assistant’s ability to understand and process natural language queries.

The agentic RAG framework of the current disclosure may employ a knowledge graph-enhanced multi-agent orchestration design that addresses the challenges of dynamic data processing in drilling operations. By combining specialized agents with a knowledge graph-based model, the system may enables context-aware queries, seamless data integration, and actionable insights.

Figure 18:
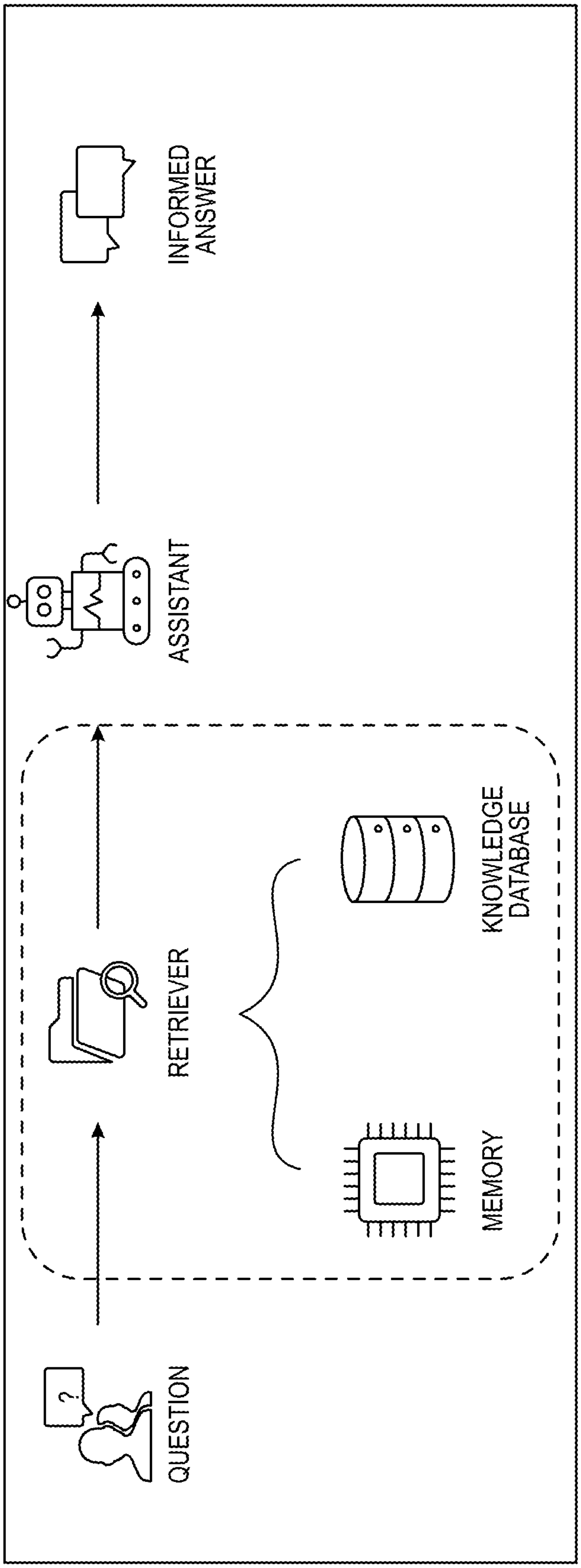
FIG. 18 illustrates a flowchart showing an example of retrieval augmented generation, according to an embodiment.

For example, according to certain embodiments, in addition to the knowledge graph 1700, the system may incorporate a memory handling mechanism as seen in FIG. 18. In certain embodiments, chat history may be stored as an evolving context knowledge base. As the system interacts with users, the chat history is continuously expanded, forming an additional RAG resource for improved information retrieval over time.

Figure 19:
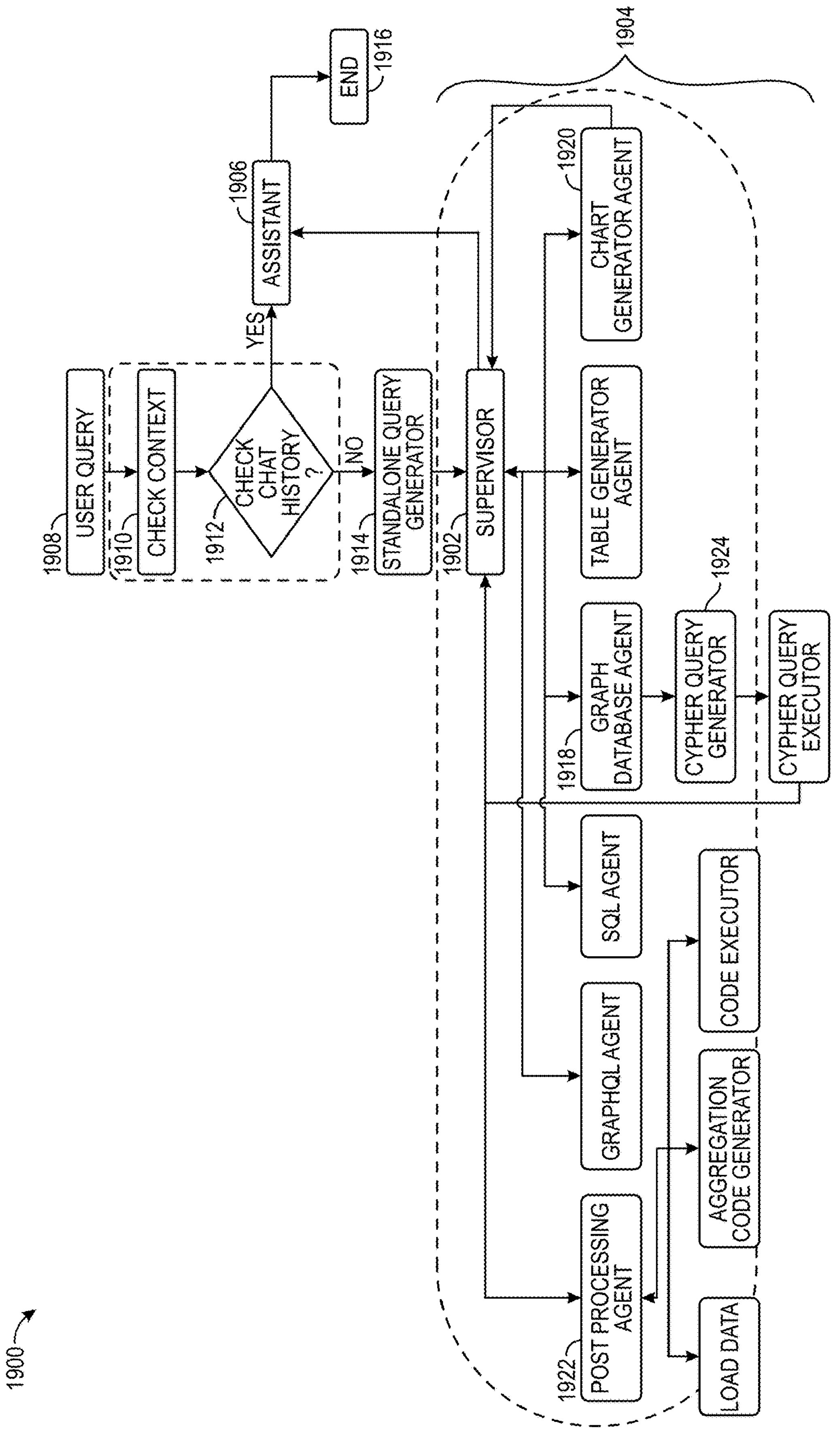
FIG. 19 illustrates an exemplary architecture for an agentic RAG framework, according to an embodiment.

FIG. 19 shows an illustration of a RAG system framework 1900 including a chat history and knowledge graph database. According to certain embodiments, the framework 1900 may follow an orchestration pattern where a supervisor agent 1902 centrally manages interactions among multiple sub-agents 1904. Each agent 1904 may be implemented using GPT-4o, with specialized role designed to handle distinct tasks in a modular and efficient manner. The design leverages the knowledge graph 1700 as a unified representation of entities and relationships in drilling operations, such as rigs, wells, and telemetry events, acting as knowledge base providing the agent 1904 with additional domain context for information retrieval. An assistant 1906 may function as the primary interface for user interaction, receiving inputs from both a memory and a user. Upon receiving a user query 1908, the system 1900 first checks the context of the query as at step 1910 and then a chat history 1912 for a suitable answer. If an answer is found, the answer may be immediately delivered to an end point 1916, such as a user or associated screen via the assistant 1906. In certain embodiments, if a suitable answer is not found, the query is augmented with relevant context from the chat history and provided context, forming a standalone version 1914. This standalone query 1914 is then passed to the supervisor 1902, which orchestrates designated sub-agents 1904 for task execution. Each sub-agent 1904 processes its assigned task and reports back to the supervisor 1902, which aggregates the results and forwards them to the assistant 1906 for final user delivery to end point 1916.

In certain embodiments, the Agentic RAG framework 1900 may operate through a cohesive interplay of specialized sub-agents 1904, each fulfilling a dedicated role within the system. By leveraging the modular nature of these agents 1904, the framework 1900 may ensure that complex user queries 1908, in particular those related to drilling operations, are handled efficiently and dynamically. Each sub-agent 1904 contributes to the overall system's capabilities, enabling seamless integration between natural language queries, graph-based retrieval, and visualization.

In certain embodiments, the supervisor 1902 acts as the central orchestrator of the system. Upon receiving a user query 1908, it determines which sub-agents 1904 are required to fulfill the request and coordinates their tasks. For example, when a user requests, "Generate a performance report for Rig A over the last quarter," the supervisor 1902 may delegate the query to a graph database agent 1918 for retrieving event data and a chart generator agent 1920 for creating a corresponding visualization. The supervisor 1902 may ensure that each sub-agent's 1904 output is aggregated into a unified response.

According to certain embodiments, the graph database agent 1918 may interface directly with the knowledge graph 1700, translating user queries 1908 into cypher commands to retrieve relevant data. Cypher, a declarative query language designed specifically for graph databases, excels at representing and querying relationships between entities. Its intuitive syntax may allow the graph database agent 1918 to focus on extracting meaningful insights without relying on complex nested queries or joins, as seen in traditional SQL systems. Specifically, based on the user's query 1908 and the provided context including schema and event descriptions, the graph database agent 1918 generates cypher queries which are then executed to retrieve the relevant data from the graph database, ensuring accurate and contextually relevant responses to user queries.

For example if the user query 1908 includes the phrase "Show all events related to Rig A in the last quarter," the generated cypher query may provide:

```
MATCH (r:Rig)-[:HAS_EVENT]→(e:Event)-[:OCCURRED]→(t:Time)
WHERE r.name='Rig A' AND t.quarter='Q3' AND t.year=2024
RETURN e.name AS EventName, e.timestamp AS Timestamp
ORDER BY e.timestamp ASC
LIMIT 100
```

This process may ensure that complex relationships, such as those involving time, events, and rigs, are efficiently retrieved from the graph model, providing precise and actionable insights for drilling operations.

Furthermore, by harnessing the advanced natural language understanding capabilities of large language models (LLMs), user-posed general queries 1908 can be effectively interpreted and transformed into well-structured cypher queries as shown in FIG. 20. This facilitates the generation of informative and relevant results, enhancing the overall user experience.

In certain embodiments, the chart generator agent 1920 may serve as a crucial component in delivering visual clarity to drilling operations, dynamically creating visual representations such as bar charts, pie charts, heat maps, and trend lines. The chart generator agent 1920 includes the ability to generate JavaScript code for real-time rendering by front-end frameworks directly in the browser. This approach may leverage the power of LLMs to dynamically craft code, making it particularly well-suited for integrating with visualization libraries like Plotly or D3.js.

For example, according to an embodiment, after the graph database agent 1918 may retrieve event data for a rig, the chart generator agent 1920 may translate this data into interactive visualizations. A pie chart for instance could be rendered to illustrate downtime causes across multiple rigs, or a trend line might display ROP performance metrics over a selected time range. These visualizations are not static and users may interact with them in real-time, enabling deeper insights and exploration of the data. This capability may be especially impactful in the context of drilling operations, where complex telemetry data and performance metrics must be distilled into actionable insights. By empowering users to generate and view charts dynamically, the chart generator agent 1920 may significantly reduce the time required for analysis and improves decision-making efficiency. Moreover, the chart generator agent's 1920 ability to generate JavaScript code ensures that visualizations remain highly flexible, customizable, and seamlessly integrated into the broader digital ecosystem of the framework. Incorporating LLM-generated code introduces an additional layer of adaptability. For example, a user querying "Compare the ROP performance of Rig A and Rig B over the last six months" triggers the agent to retrieve data, generate JavaScript code for the requested chart type (e.g., a bar chart or comparative trend lines), and render it directly in the user's browser. This workflow may eliminate the need for manual intervention in chart creation, significantly enhancing the agility of the system.

In certain embodiments, the agentic RAG framework 1900 may also include a validation agent. The validation agent may be used in maintaining the accuracy, reliability, and performance of the agentic RAG framework 1900. The validation agent may be used to ensure that the data retrieved by the graph database agent 1918 adheres to predefined standards and that the execution of cypher queries is both accurate and efficient. By leveraging the query planning and execution plan capabilities of the agentic RAG framework 1900, the agent evaluates query quality before execution, preventing performance bottlenecks and ensuring a seamless user experience. In certain embodiments, the validation agent may cross-reference retrieved data against operational records and telemetry logs to confirm alignment. For example, if telemetry data is queried for a specific time range, the validation agent may ensure that the timestamps and event details match operational logs. Any inconsistencies may be flagged and addressed before the data is presented to the user. This ensures that the insights generated by the framework are based on accurate and high-quality data. In certain embodiments, the validation agent may pre-evaluate cypher queries using the execution plan capabilities of the agentic RAG framework 1900. This process involves analyzing the query plan to identify potential performance issues such as excessive data retrieval or inefficient patterns (e.g., reading one million events in a single query).

For example, according to an embodiment, if the user query 1908 is too broad and retrieves a large dataset, the validation agent may assess the execution plan to estimate query costs and identify bottlenecks. A query planner may provide insights into the query's expected performance by examining factors such as node and relationship traversal counts, filtering steps, and index usage.

According to certain embodiments, when performance issues are identified, the validation agent may collaborate with a cypher query generator 1924 to optimize the query. For instance, if a query 1908 retrieves an excessively large dataset or a dataset that is above a predetermined size threshold, the validation agent may refine it by adding constraints, limiting results, or restructuring the query for better efficiency. If the issue arises from the user's query 1908 itself (e.g., vague or overly ambitious requirements), the validation agent may send feedback to the user, prompting them to refine their input. This adaptive query regeneration capability may ensure that the system balances performance with user requirements, delivering insights promptly without overloading the database or delaying execution.

For example, according to an embodiment, a user may submit a user query 1908 which includes the request "Retrieve all downtime events for Rig B in the past six months." The validation agent may pre-evaluates the user query 1908. If necessary, the sub-agent 1904 may work with the cypher query generator 1924 to optimize the query 1908 or send feedback to the user to refine their request, for example via the assistant 1906. The optimized query may then be executed, providing accurate and actionable insights without performance issues. By incorporating agentic RAG platform's 1900 execution planning tools and dynamic query adaptation, the validation agent may ensure that both data accuracy and system performance are upheld. This capability is particularly valuable in the context of drilling operations, where data integrity and timely insights are used for operational success.

According to certain embodiments, the sub-agents 1904 collaborate dynamically under the supervision of the supervisor agent 1902. For example, the sub-agents 1904 may perform sequential task execution where tasks are broken down into smaller steps and assigned to the sub-agents 1904. In certain embodiments, retrieving event data via the graph database agent 1918 may precede visualization via the chart generator agent 1920. Where possible, sub-agents 1904 may operate in parallel to minimize latency. For instance, while the graph database agent 1918 performs a query, the validation agent may simultaneously pre-validate metadata. In certain embodiments, sub-agents 1904 may communicate iteratively to refine outputs within feedback loops. For example, if inconsistencies are flagged by the validation agent, the supervisor 1902 may instruct the graph database agent 1918 to re-query with adjusted parameters. In certain embodiments, a post processing agent 1922 may be directly connected to the supervisor 1902 so as to apply computation or aggregation functions based on the data retrieved from the knowledge graph 1700.

The agentic RAG framework 1900 was tested using a dataset of 3 million tracking events and 1,000 wells. Key metrics included query accuracy where the system achieved an overall accuracy of 100% across a benchmark set of 50 test queries. Details can be found in Table 2 below. Specifically, the test set was categorized as follows: 15 queries involved basic-level tasks requiring straightforward Cypher query generation, achieving 100% accuracy. An additional 20 queries were of medium complexity, necessitating the generation of more intricate Cypher queries that captured relationships among different nodes. Finally, 15 queries were classified as hard or complex, requiring advanced query generation capabilities such as timestamp interpretation, relationship handling, and mapping across multiple entities.

TABLE 2

| Accuracy\User query complexity | Basic level | Medium | Hard |
|---|---|---|---|
| Accuracy before validation | 100% | 95% | 86.67% |
| Accuracy after validation | 100% | 100% | 100% |

Validation tests revealed that the LLM exhibited robust performance in interpreting user queries and generating valid, executable Cypher queries. The generated Cypher queries demonstrated accurate structure and parameterization, ensuring successful execution. However, further analysis identified that errors or issues originated from poorly formatted user inputs, which led to ambiguities in the LLM's interpretation and subsequent query generation. In certain embodiments, the validation agent may be able to capture and report the issue back to the user and regenerate the query correctly. This highlights the impact of human input quality on the performance of the LLM in task execution. Additionally, queries containing examples need to be clearly delineated and explicitly stated to ensure that the LLM can effectively distinguish between illustrative examples and the designated parameters to be retrieved.

Table 3 shows the information about latency on validation test. In certain embodiments, the end-to-end query latency represents the total time required to process a user query 1908, encompassing the stages from user input, Cypher query generation, query execution, and the delivery of the final response to the end user. For basic-level queries, the average end-to-end latency was approximately 3 seconds, whereas for complex queries, it averaged 7.67 seconds. Cypher Query Generation Latency as seen in Table 3 refers to the time taken by the LLM to generate a Cypher query for a given user input 1908. The average Cypher query generation latency ranged from 1 to 3 seconds, depending on query complexity (basic to hard or complex). Cypher Query Execution Latency as seen in Table 2 denotes the time required to execute a generated Cypher query. The average Cypher query execution latency varied from 0.2 to 2.21 seconds, increasing with query complexity. In certain embodiments, the validation test maintained a consistent performance under workloads simulating 1,000 concurrent users.

TABLE 3

| Response time\User query complexity | Basic level | medium | Hard |
|---|---|---|---|
| Average End-to-End Query latency (s) | 3.06 | 5.30 | 7.67 |
| Average Cypher query generation latency (s) | 1.02 | 1.69 | 3.33 |
| Average Cypher query execution latency (s) | 0.20 | 0.54 | 2.21 |

The structured data is ingested into the graph database, where entities and their relationships are modeled to reflect the operational environment accurately. By representing Rig Information, Event Tracking Usage, and Service Information as nodes and edges within the graph, the system can perform complex queries that traverse these relationships.

For example, the assistant can correlate events with specific rigs or services, enabling multifaceted analysis. A query like "What events led to the decreased performance of Service B on Rig Y last week?" becomes feasible. The assistant can navigate the graph to retrieve relevant data across different types and present a comprehensive analysis.

By utilizing structured data according to certain embodiments, the assistant enhances its ability to generate accurate analyses and interactive visualizations. When an operator requests a specific plot or diagram, such as a log plot of drilling parameters, the assistant leverages the structured data to retrieve precise values and generate the visualization. For instance, if an operator asks, "Show me the rate of penetration over the last 12 hours for Well X," the assistant can use the EventTime from event tracking usage and WellName from rig information to filter and retrieve the necessary data points. It may then generate a plot displaying the rate of penetration over the specified time frame, providing valuable insights into drilling performance.

Figure 21A:
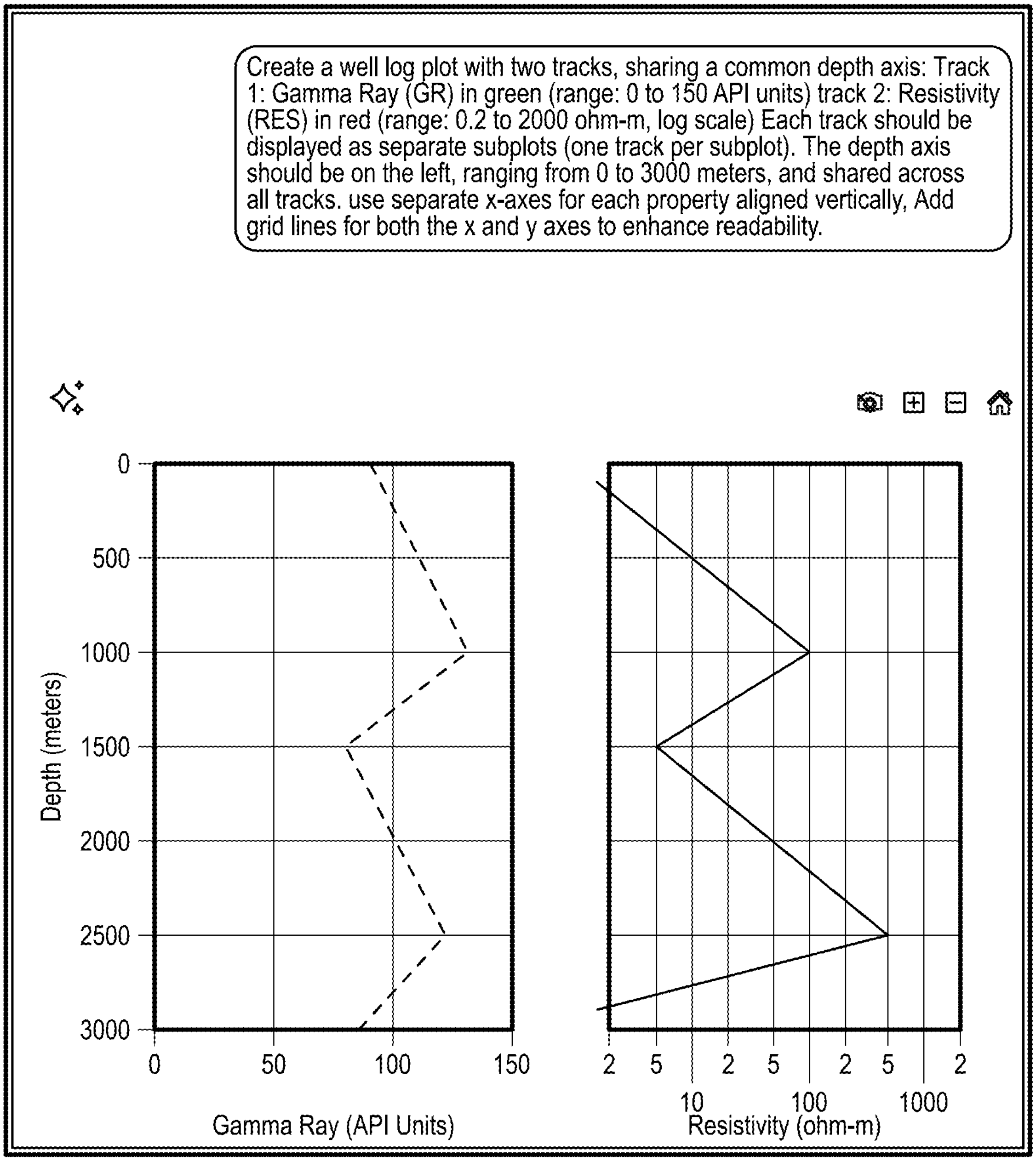
FIGS. 21A and 21B illustrate a generated visualization being displayed within a chat window of a graphical interface, according to an embodiment.
Figure 21B:
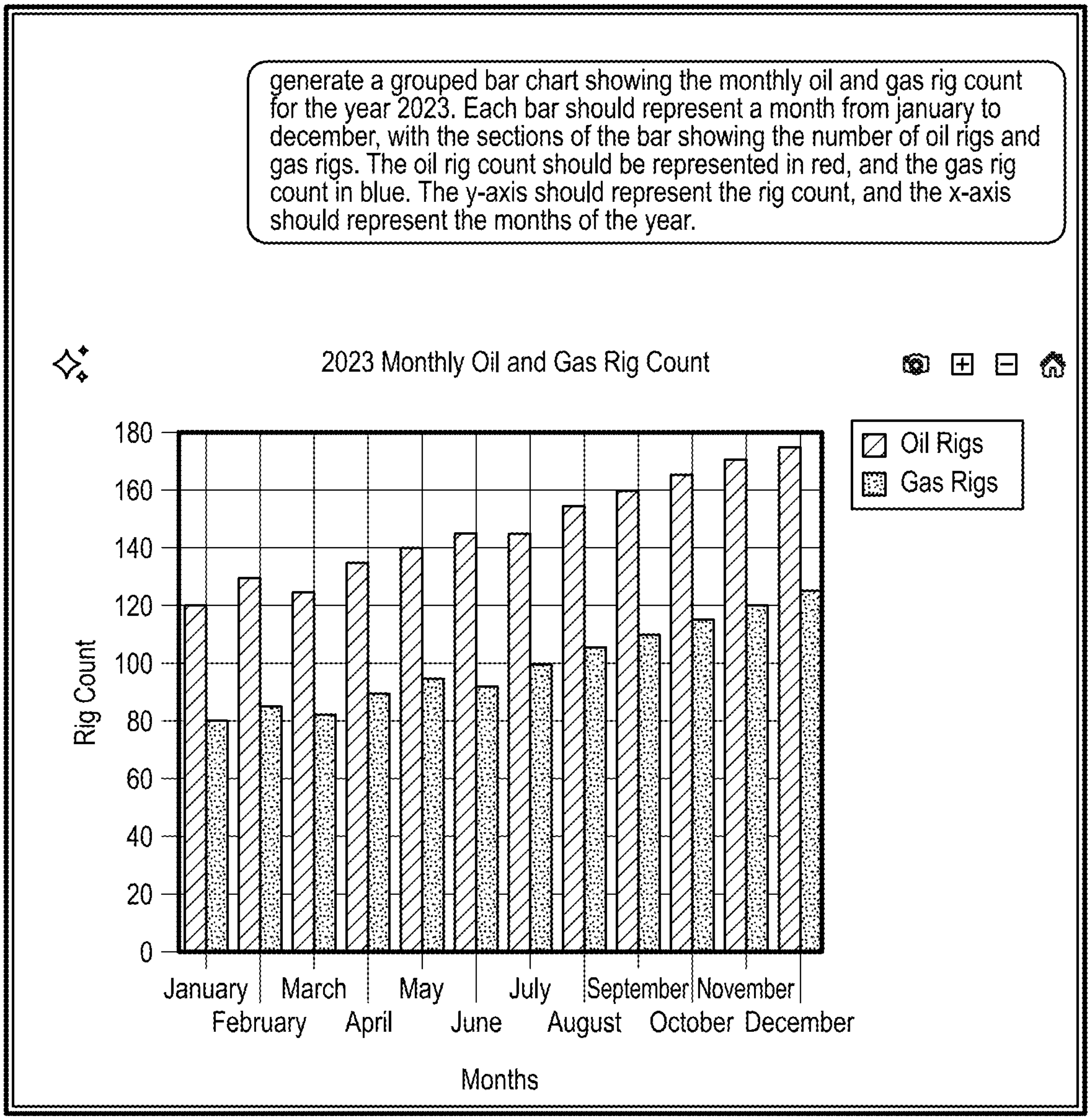

According to certain embodiments, the integration of structured data allows the assistant to handle complex, domain-specific queries that require cross-referencing multiple data types. Operators can ask questions that involve temporal constraints, specific events, or correlations between different operational aspects. For example, an operator may query "How many times was the WITSML connection restarted on Rig A in the past month?", "Which rigs experienced high torque and drag issues after updating to Rig Control System version Y?", or "Provide a timeline of service downtimes and their impact on drilling operations for Well Z." A corresponding plot may then be generated which displays the results of the query as seen in FIG. 21A and FIG. 21B. By effectively managing and utilizing structured data, the assistant delivers comprehensive responses that support informed decision-making and enhance operational efficiency.

According to certain embodiments, the assistant may utilize a Retrieval Augmented Generation (RAG) system which combines the capabilities of large language models (LLMs) with information retrieval from the graph and vector databases. In certain embodiments, when a user inputs a query, the system processes it using natural language understanding, retrieves relevant data from the databases, and generates a context-rich response. This approach ensures that the assistant provides accurate and up-to-date information, grounded in the integrated data sources.

Figure 22:
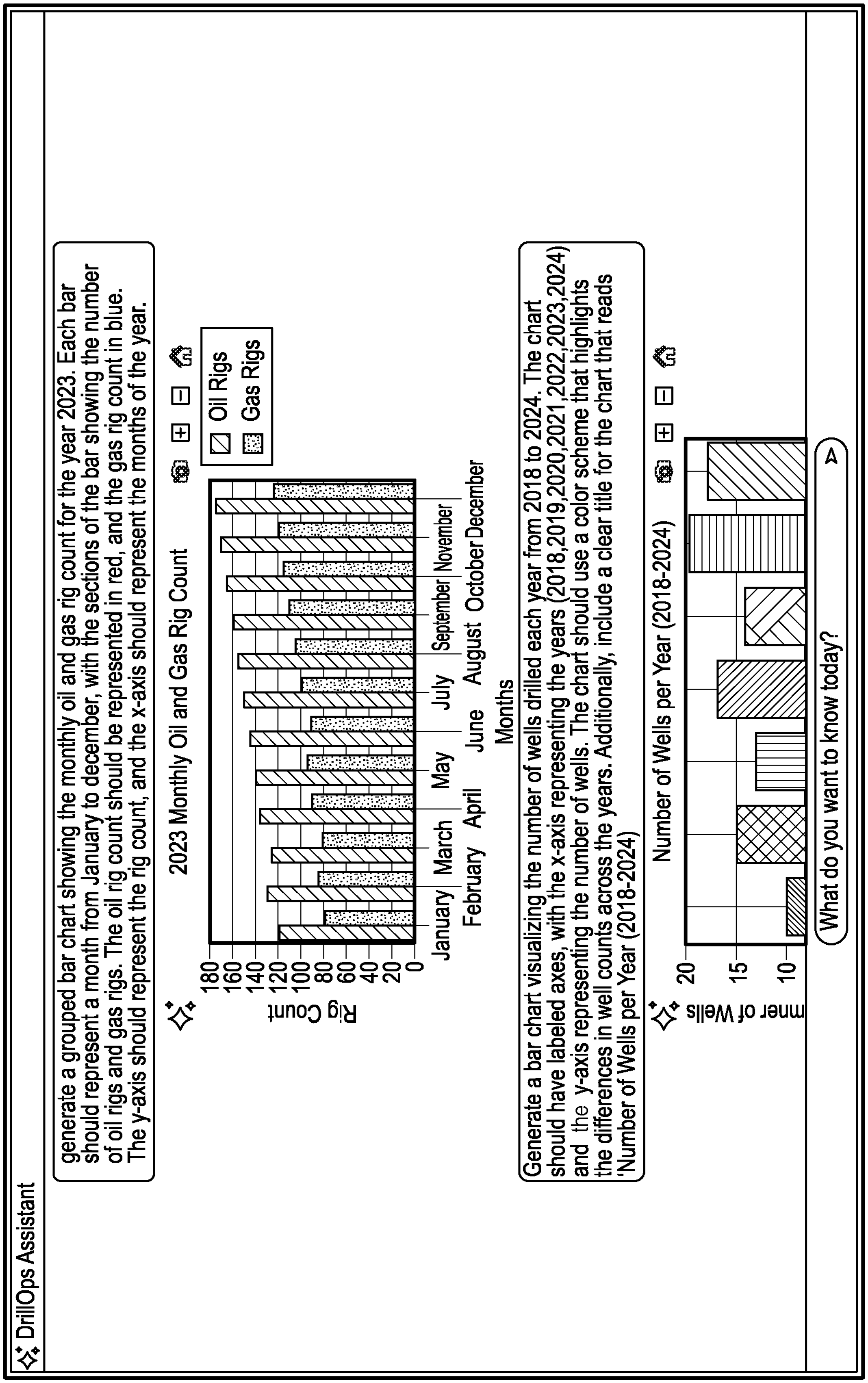
FIG. 22 illustrates a generated visualization being displayed within a chat window of a graphical interface, according to an embodiment.

In certain embodiments, the assistant may have the ability to generate interactive plots and diagrams within the chat interface. Operators can request specific drilling plots, such as ToolFace plots, log plots, and other diagrams essential for understanding drilling parameters. For example, an operator might ask "Show me the current toolface plot for well X" or "Generate a log plot of the last 100 meters drilled." The assistant may process these requests, retrieves the necessary data, and generates the requested visualizations, displaying them directly in the chat interface as seen in FIG. 22. This capability enhances the user's understanding of complex data and supports informed decision-making.

Figure 23:
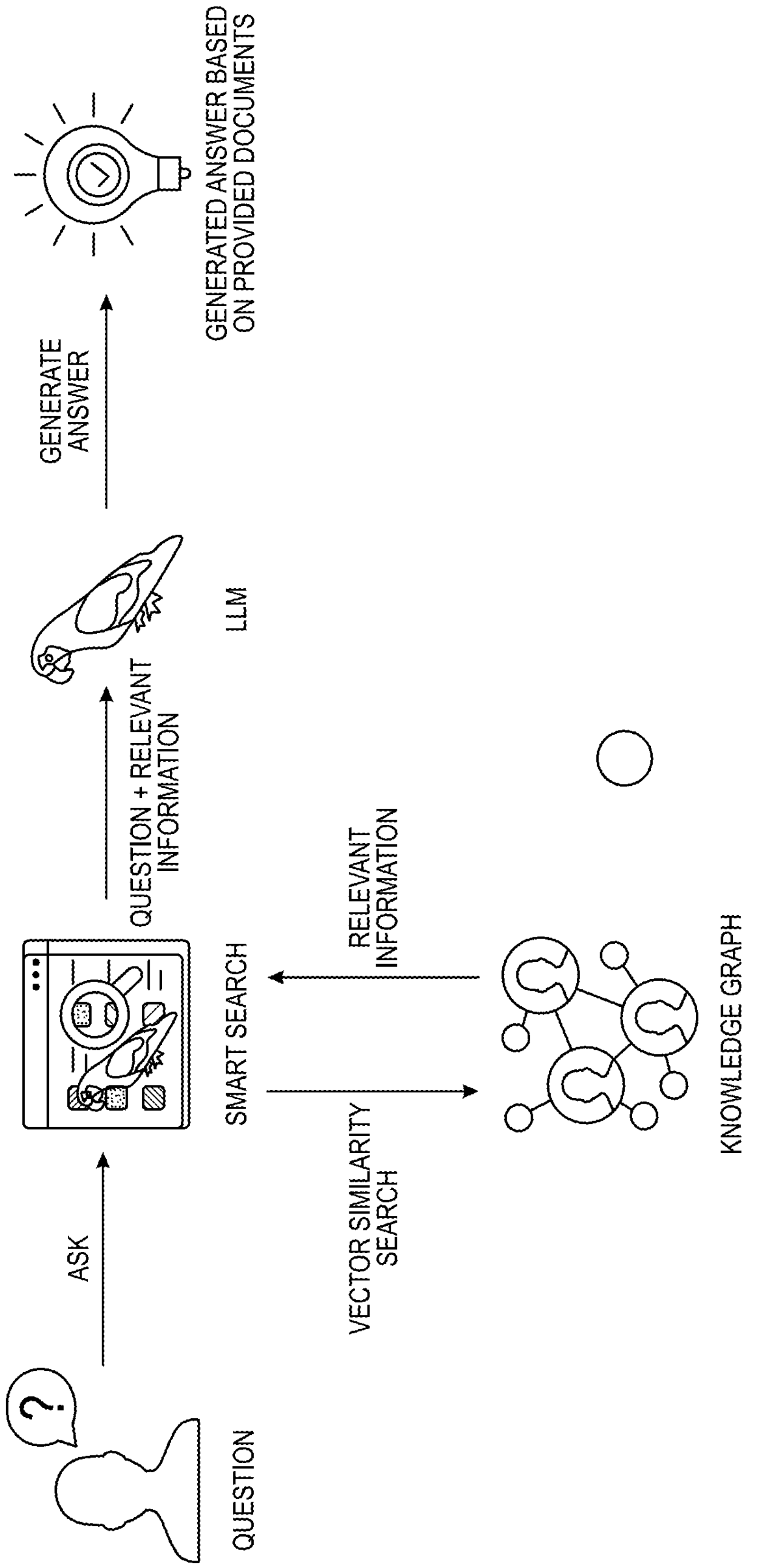
FIG. 23 illustrates a flowchart for performing the current method utilizing retrieval augmented generation and large language models, according to an embodiment.

An example of how the current method implements a RAG system with a knowledge graph may be seen in FIG. 23. According to certain embodiments, an operator inputs a natural language query into the chat interface. The assistant may then process the query using natural language understanding, identifying the intent and extracting relevant entities. The system may then query the graph and vector databases to retrieve relevant structured and unstructured data. Using the RAG system, the assistant may then generate a response that includes textual information and, if requested, interactive visualizations. The assistant may present the information and visualizations in the chat interface, allowing the user to interact with the data as needed.

Figure 24:
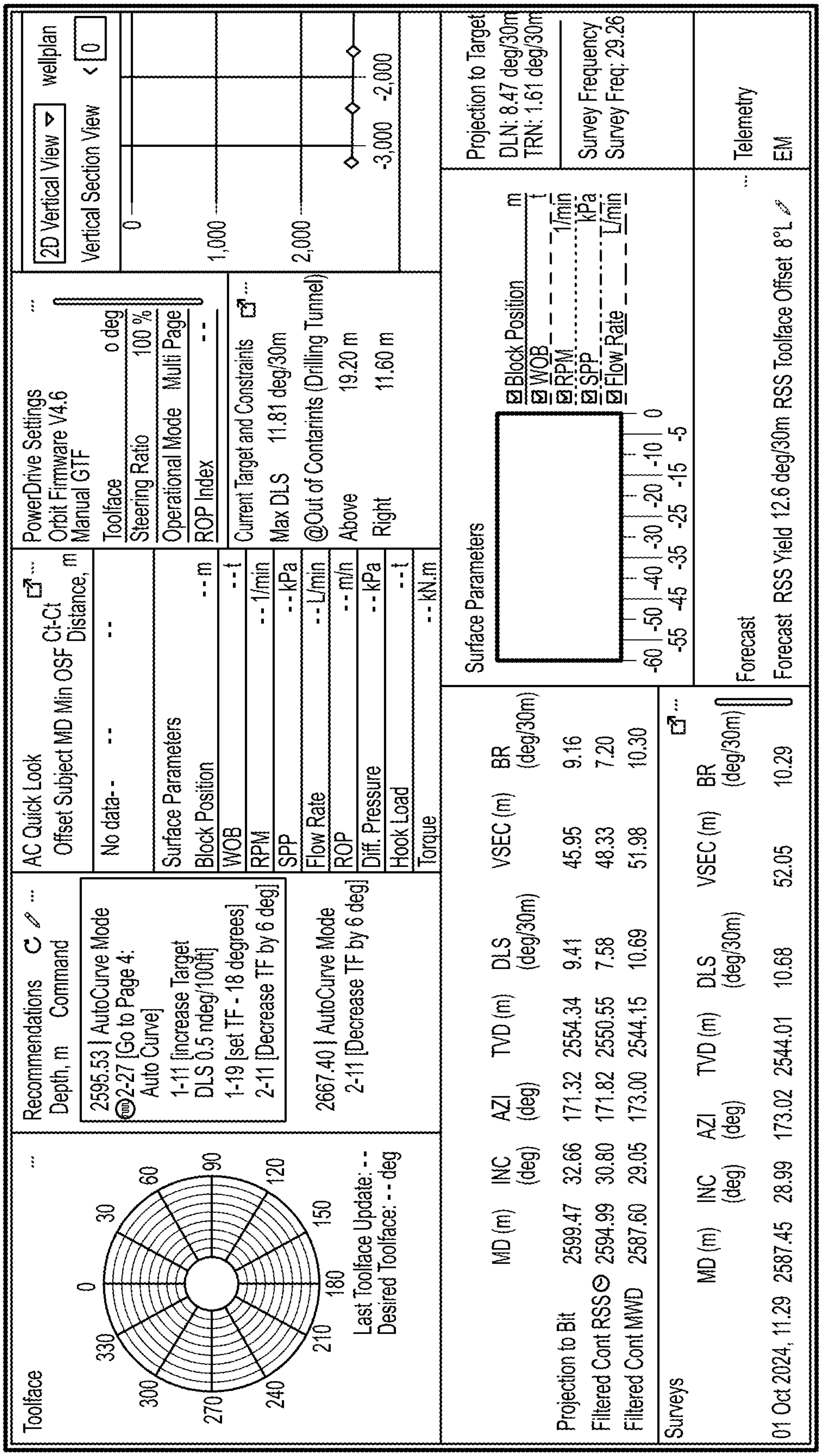
FIG. 24 illustrates a domain dashboard generated by the generative AI within a graphical interface, according to an embodiment.

According to one embodiment, a more specific example may include an operator who is overseeing drilling operations wants to assess the current status and identify any potential issues submits the query "Are there any disturbances affecting the drilling operation right now?" The assistant may then generate a response which includes "Currently, there is an increase in torque and drag, which may indicate potential hole cleaning issues. The rate of penetration has decreased by 15% in the last hour. Here is the current toolface plot and a log plot of the drilling parameters over the past 24 hours." The assistant may also display the requested plots within the chat, or as a generated domain dashboard as seen in FIG. 24, allowing the operator to visualize the data and make informed decisions promptly.

The current agentic RAG framework improves operational efficiency of drilling operations by providing quick access to comprehensive operational data and visualizations, namely by the assistant helping reduce non-productive time and improving the efficiency of drilling operations. Additionally, the integration of domain-specific knowledge and advanced analytics enables operators to make informed decisions under pressure while the ability to generate and display plots and diagrams within the chat interface enhances the user's understanding of complex drilling parameters. The current invention provides a user-friendly interface by providing natural language interaction and intuitive visualizations which make the system accessible to users with varying levels of technical expertise. The use of graph databases and vector databases further allows for the efficient handling of complex queries and data relationships, providing a unified view of operational data. By integrating unstructured domain knowledge, the system ensures that best practices and procedural information are readily accessible, thereby further aiding in training and decision-making.

In certain embodiments, the agentic RAG framework may be transformative across various facets of drilling operations, particularly in enabling more effective decision-making and operational efficiencies in environments where traditional tools fall short. By leveraging the underlying knowledge graph and multi-agent orchestration, the framework may empower different stakeholders with targeted insights tailored to their needs, whether they are support engineers, domain experts, or operations managers.

For example, one of the most impactful applications may be support engineering for rigs operating in remote environments where software is deployed on edge devices rather than centralized cloud systems. In such scenarios, accessing and consolidating telemetry data, deployment logs, and operational metadata has historically been a time-intensive and error-prone process. With the framework, support engineers may now query the knowledge graph directly to retrieve a comprehensive overview of deployment details. For example, by querying the status of all software versions deployed across rigs in a particular region, engineers may quickly identify discrepancies, such as outdated deployments or missing updates. This capability has significantly streamlined support workflows, enabling faster resolution of issues and reducing downtime associated with troubleshooting.

For domain experts, the framework may unlock unprecedented capabilities in performing complex statistical analyses. By integrating telemetry logs with operational data, domain experts may now execute queries that were previously impossible or required significant manual effort. For instance, the ability to analyze the number of downlink commands issued in conjunction with the Rate of Penetration (ROP) performance of a specific tool provides a new dimension of insight into drilling efficiency. This type of analysis enables experts to identify patterns that suggest opportunities for optimization, such as adjusting tool configurations to improve drilling speed or mitigating inefficiencies in downlink communication. These insights, derived from combining structured and unstructured data in the knowledge graph, have directly contributed to improved operational performance and reduced costs.

Furthermore, the framework may be valuable in telemetry monitoring, where real-time anomaly detection may be enhanced through the dynamic querying capabilities of the knowledge graph. For example, during high-pressure drilling operations, anomalies in torque values may be identified early, prompting timely corrective actions. This may not only prevent potential equipment failures but also ensure the safety of personnel and assets on-site. By providing a real-time view of telemetry data integrated with historical context, the framework has enabled drilling operators to make proactive decisions, mitigating risks before they escalate.

In certain embodiments, the agentic RAG framework may represent a significant advancement in the digital transformation of drilling operations. Its ability to bridge the gap between disparate data sources through a unified knowledge graph is a cornerstone of its effectiveness, providing a comprehensive view of the data ecosystem. This capability may empower stakeholders across the drilling lifecycle, from support engineers troubleshooting deployments in remote rigs to domain experts conducting sophisticated analyses of ROP performance and tool configurations. The result is improved reporting accuracy, enhanced decision-making, and optimized production strategies, fundamentally transforming the management of drilling operations.

By orchestrating multiple intelligent agents, the framework may have the ability to tackle diverse challenges, such as telemetry monitoring, predictive maintenance, and workflow optimization. The seamless integration of knowledge graphs with natural language interfaces has not only streamlined workflows but also enabled stakeholders to derive actionable insights in real time. These achievements underscore the framework's potential to address the complexities of modern drilling environments, where dynamic and data-intensive workflows demand adaptive and intelligent solutions.

The framework's versatility may open avenues for further innovation. A focus will be the integration of additional specialized agents designed to address increasingly complex domain-specific tasks. For example, agents capable of interpreting geological data or simulating drilling scenarios could provide insights to directional drillers and operators. Such advancements would move the framework beyond analysis and reporting, enabling it to actively participate in decision-making processes.

Moreover, the framework's ability to model and query complex relationships within the knowledge graph can be extended to incorporate domain-specific interpretations and recommendations. In certain embodiments, agents could be trained to provide prescriptive analytics, offering actionable suggestions for driller or directional driller operations, such as adjustments in well trajectory or optimized tool usage strategies based on real-time conditions.

Additionally, as drilling operations continue to evolve, the incorporation of autonomous agents capable of self-learning and improving their recommendations will be a natural progression.

In certain embodiments, these agents could leverage advanced techniques like reinforcement learning and self-criticism to refine their decision-making processes, ensuring that the framework remains adaptable and effective in the face of new challenges.

The Agentic RAG Framework may serve as the basis for a new approach to drilling operations, combining cutting-edge AI techniques with domain-specific knowledge to deliver unparalleled insights and operational efficiency. Its future may lie in expanding its capabilities to tackle even more complex tasks, driving innovation and ensuring its long-term impact on the energy industry.

Exemplary Method

Figure 25:
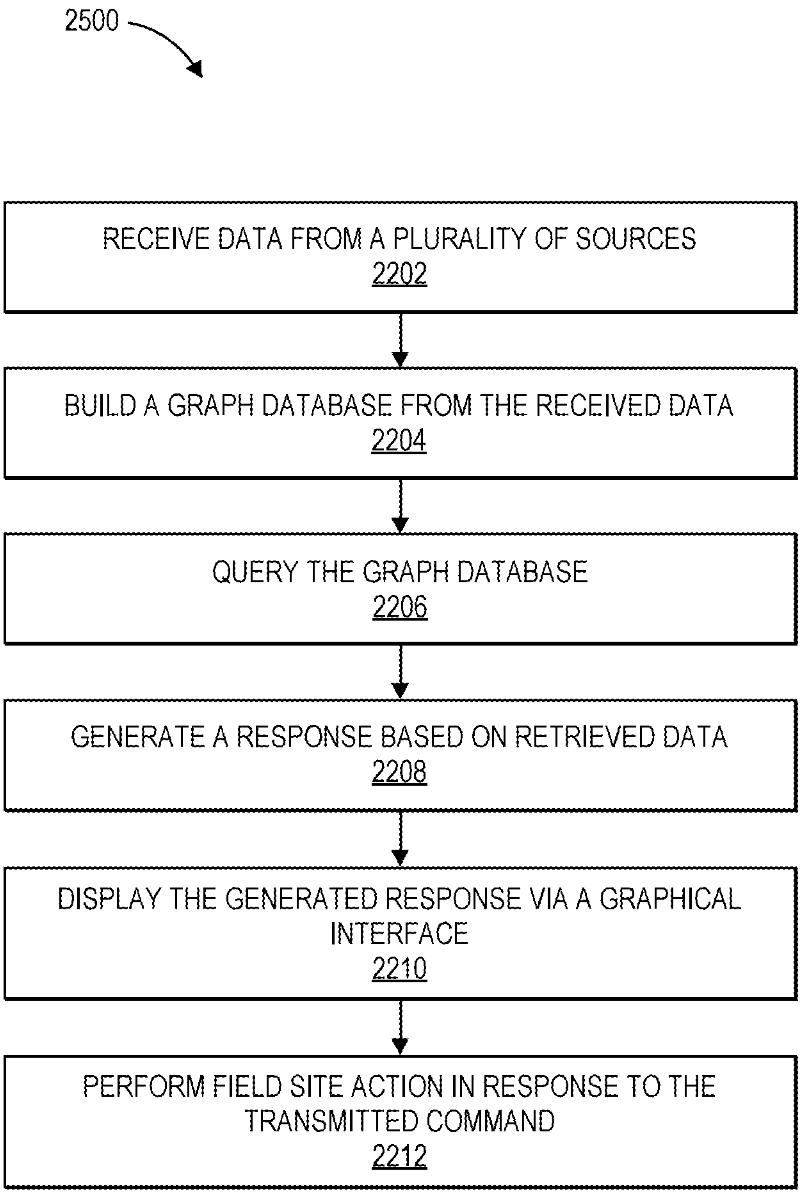
FIG. 25 illustrates a flowchart of a method for providing advanced analytics and domain-specific insights related to a site, according to an embodiment.

FIG. 25 illustrates a flowchart of a method 2500 for providing advanced analytics and domain-specific insights related to a site. In certain embodiments, the method includes receiving data from a plurality of sources, as at 2202. The received data may include structured data and unstructured data. The structured data may be received from a wellsite and may include rig information, event tracking usage, and service information. The unstructured data may include data retrieved from procedure documents, drilling domain knowledge documents, and application programming interface/event definition documents.

According to certain embodiments, the method includes building a graph database from the received data, as at 2204. The graph database may include a plurality of nodes, specifically that any rig information, event tracking usage, and service information each form at least one node within the graph database, according to an embodiment.

According to certain embodiments, the method 2500 includes querying the graph database, as at 2206. Querying the graph database may include a user inputting a natural language query into a chat interface portion of a graphical interface. The input query may then be processed using natural language understanding to identify at least one entity within the input query. Data may then be retrieved from the graph database that is relevant to the identified entity.

According to certain embodiments, the method 2500 includes generating a response based on the retrieved data, as at 2208. The response may be generated using a retrieval augmented generation system. In certain embodiments, the generated responses may include at least one of a text response or a visualization response. The visualization response may specifically include an interactive plot or diagram.

According to certain embodiments, the method 2500 includes displaying the generated response via the graphical interface, as at 2210. The generated response may be displayed in the chat interface portion of the graphical interface.

According to certain embodiments, the method 2500 includes performing a wellsite action based on the displayed response, as at 2212. Performing the wellsite action may include generating or transmitting a signal that instructs or causes an action to occur. The action includes a physical action. The physical action includes selecting where to drill a wellbore in the subsurface formation, drilling the wellbore, varying a trajectory of the wellbore, varying a weight or torque on a drill bit that is drilling the wellbore, varying a rate or concentration of a fluid being pumped into the wellbore, or a combination thereof.

Exemplary Computing System

Figure 26:
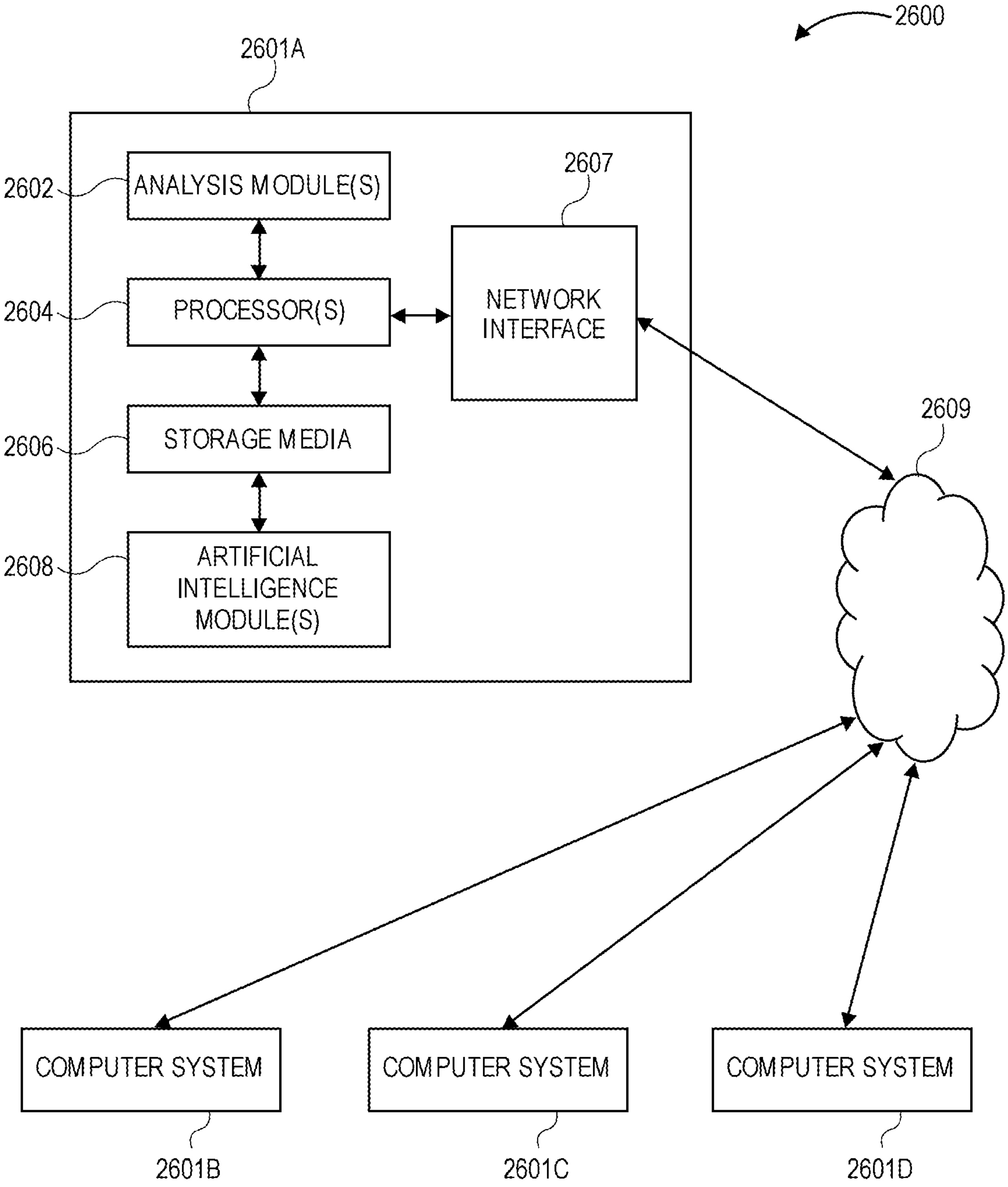
FIG. 26 illustrates a schematic view of a computing system for performing at least a portion of the method(s) described herein, according to an embodiment.

In some embodiments, the methods of the present disclosure may be executed by a computing system. FIG. 26 illustrates an example of such a computing system 2600, in accordance with some embodiments. The computing system 2600 may include a computer or computer system 2601A, which may be an individual computer system 2601A or an arrangement of distributed computer systems. The computer system 2601A includes one or more analysis modules 2602 that are configured to perform various tasks according to some embodiments, such as one or more methods disclosed herein. To perform these various tasks, the analysis module 2602 executes independently, or in coordination with, one or more processors 2604, which is (or are) connected to one or more storage media 2606. The processor(s) 2604 is (or are) also connected to a network interface 2607 to allow the computer system 2601A to communicate over a data network 2609 with one or more additional computer systems and/or computing systems, such as 2601B, 2601C, and/or 2601D (note that computer systems 2601B, 2601C and/or 2601D may or may not share the same architecture as computer system 2601A, and may be located in different physical locations, e.g., computer systems 2601A and 2601B may be located in a processing facility, while in communication with one or more computer systems such as 2601C and/or 2601D that are located in one or more data centers, and/or located in varying countries on different continents).

A processor may include a microprocessor, microcontroller, processor module or subsystem, programmable integrated circuit, programmable gate array, or another control or computing device.

The storage media 2606 may be implemented as one or more computer-readable or machine-readable storage media. Note that while in the example embodiment of FIG. 26 storage media 2606 is depicted as within computer system 2601A, in some embodiments, storage media 2606 may be distributed within and/or across multiple internal and/or external enclosures of computing system 2601A and/or additional computing systems. Storage media 2606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

It should be appreciated that computing system 2600 is merely one example of a computing system, and that computing system 2600 may have more or fewer components than shown, may combine additional components not depicted in the example embodiment of FIG. 26, and/or computing system 2600 may have a different configuration or arrangement of the components depicted in FIG. 26. The various components shown in FIG. 26 may be implemented in hardware, software, or a combination of both hardware and software, including one or more signal processing and/or application specific integrated circuits.

Further, the steps in the processing methods described herein may be implemented by running one or more functional modules 2608 in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 2600, FIG. 26), and/or through manual control by a user who may make determinations regarding whether a given step, action, template, model, or set of curves has become sufficiently accurate for the evaluation of the risk index.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for providing advanced analytics and domain-specific insights related to a site, the method comprising:

receiving site data related to the site;

building a graph database from the site data;

receiving a natural language query;

sending the natural language query to a supervisor agent;

delegating, by the supervisor agent, tasks associated with the natural language query to a plurality of sub-agents including a graph database agent and a validation agent;

responsive to delegating, by the supervisor agent, the tasks:

generating, by the graph database agent, a graph query responsive to the natural language query;

retrieving graph data from the graph database using the graph query; and validating, by the validation agent, the graph data by cross-referencing the graph data against operational records associated with the site, resulting in validated data;

generating a response based on the validated data; and displaying the response within a graphical interface on a screen.

2. The method of claim 1, wherein generating the response based on the validated data comprises:

reviewing a chat history for a chat response related to the natural language query;

displaying the response on the screen when the chat response is found in the chat history; and sending the natural language query to the supervisor agent based on failing to locate the chat response in the chat history.

3. The method of claim 1, wherein generating the response comprises generating a cypher query for execution to retrieve the graph data from the graph database.

4. The method of claim 3, wherein validating, by the validation agent, the graph data comprises cross-referencing the graph data from the graph database against the operational records associated with the site to identify inconsistencies between the graph data from the graph database and the operational records associated with the site.

5. The method of claim 3, further comprising:

estimating, by the validation agent, a query cost based on the cypher query; and optimizing, by the graph database agent, the cypher query when the query cost is above a predetermined threshold.

6. The method of claim 5, wherein optimizing the cypher query when the query cost is above the predetermined threshold comprises:

sending feedback to a user requesting an updated query; and generating the response by generating, by the graph database agent, an updated graph query based on the updated query.

7. The method of claim 3, wherein generating the response based on the graph data comprises aggregating an output from each of the plurality of sub-agents into the response by the supervisor agent.

8. The method of claim 1, further comprising generating a control signal for modifying an operational parameter associated with the site based on the validated data.

9. The method of claim 1, wherein the supervisor agent coordinates sequential execution and parallel execution of the plurality of sub-agents.

10. The method of claim 1, wherein the validation agent evaluates an execution plan associated with the graph query prior to execution of the graph query.

11. The method of claim 1, wherein the supervisor agent causes the graph database agent to perform a refined graph query with adjusted parameters responsive to the validation agent identifying an inconsistency between the graph data and the operational records.

12. The method of claim 1, further comprising:

identifying, by the validation agent, a bottleneck associated with execution of the graph query; and optimizing the graph query based on identifying, by the validation agent, the bottleneck.

13. A computing system, comprising:

one or more processors; and a memory system comprising one or more non-transitory computer-readable media storing instructions that, when executed by at least one of the one or more processors, cause the computing system to perform operations, the operations comprising:

receiving site data related to a site;

building a graph database from the site data;

receiving a natural language query;

sending the natural language query to a supervisor agent;

delegating, by the supervisor agent, tasks associated with the natural language query to a plurality of sub-agents including a graph database agent and a validation agent;

responsive to delegating, by the supervisor agent, the tasks:

generating, by the graph database agent, a graph query responsive to the natural language query;

retrieving graph data from the graph database using the graph query; and validating, by the validation agent, the graph data by cross-referencing the graph data against operational records associated with the site, resulting in validated data;

generating a response based on the validated data;

displaying the response within a graphical interface on a screen; and performing a site action based on the response.

14. The computing system of claim 13, wherein the site data related to the site comprises structured data and unstructured data.

15. The computing system of claim 14, wherein the structured data is received from a wellsite and comprises rig information, event tracking usage, or service information.

16. The computing system of claim 14, wherein the unstructured data comprises data retrieved from procedure documents, drilling domain knowledge documents, or application programming interface or event definition documents.

17. The computing system of claim 13, wherein the graph database comprises a plurality of nodes, wherein rig information, event tracking usage, and service information each form at least one node within the graph database.

18. The computing system of claim 13, wherein performing the site action based on the response comprises generating or transmitting a signal that instructs or causes an action to occur, wherein the action comprises a physical action, and wherein the physical action comprises selecting where to drill a wellbore in a subsurface formation, drilling the wellbore, varying a trajectory of the wellbore, varying a weight or torque on a drill bit that is drilling the wellbore, varying a rate or concentration of a fluid being pumped into the wellbore, or a combination thereof.

19. The computing system of claim 13, wherein the operations further comprise modifying the graph query to reduce graph traversal operations associated with execution of the graph query.

20. A non-transitory computer-readable medium storing instructions that, when executed by one or more processors of a computing system, cause the computing system to perform operations, the operations comprising:

receiving site data related to a site;

building a graph database from the site data;

receiving a natural language query;

sending the natural language query to a supervisor agent;

delegating, by the supervisor agent, tasks associated with the natural language query to a plurality of sub-agents including a graph database agent and a validation agent;

responsive to delegating, by the supervisor agent, the tasks:

generating, by the graph database agent, a graph query responsive to the natural language query;

retrieving graph data from the graph database using the graph query; and validating, by the validation agent, the graph data by cross-referencing the graph data against operational records associated with the site, resulting in validated data;

generating a response based on the validated data;

displaying the response within a graphical interface on a screen; and performing a site action based on the response.

* * * * *